(12) United States Patent
Dahl et al.

(10) Patent No.: US 7,777,182 B2
(45) Date of Patent: Aug. 17, 2010

(54) METHOD AND APPARATUS FOR ION CYCLOTRON SPECTROMETRY

(75) Inventors: David A. Dahl, Idaho Falls, ID (US); Jill R. Scott, Idaho Falls, ID (US); Timothy R. McJunkin, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 272 days.

(21) Appl. No.: 11/833,079

(22) Filed: Aug. 2, 2007

(65) Prior Publication Data

US 2009/0032696 A1 Feb. 5, 2009

(51) Int. Cl.
*B01D 59/44* (2006.01)
(52) U.S. Cl. .................... 250/291; 250/293; 250/292; 250/290; 250/288; 250/282
(58) Field of Classification Search ............... 250/281, 250/282, 288, 290, 291, 292, 293
See application file for complete search history.

(56) References Cited

U.S. PATENT DOCUMENTS

| | | | | |
|---|---|---|---|---|
| 2,829,260 | A * | 4/1958 | Donner et al. | 250/291 |
| 3,937,955 | A | 2/1976 | Comisarow et al. | |
| 4,686,365 | A | 8/1987 | Meek et al. | |
| 4,924,089 | A | 5/1990 | Caravatti | |
| 4,931,640 | A * | 6/1990 | Marshall et al. | 250/291 |
| 4,933,547 | A * | 6/1990 | Cody, Jr. | 250/282 |
| 4,959,543 | A * | 9/1990 | McIver et al. | 250/291 |
| 5,019,706 | A * | 5/1991 | Allemann et al. | 250/291 |
| 5,389,784 | A * | 2/1995 | Weller | 250/291 |
| 6,114,692 | A * | 9/2000 | Beu | 250/282 |
| 6,573,495 | B2 | 6/2003 | Senko | |
| 6,608,302 | B2 | 8/2003 | Smith et al. | |
| 6,784,421 | B2 | 8/2004 | Park | |
| 6,803,569 | B2 * | 10/2004 | Tsybin et al. | 250/292 |
| 7,038,200 | B2 * | 5/2006 | Nikolaev | 250/291 |
| 7,078,684 | B2 | 7/2006 | Beu et al. | |
| 7,368,711 | B2 * | 5/2008 | Franzen et al. | 250/291 |

(Continued)

OTHER PUBLICATIONS

F. Kuhnen et al., Investigation of the ion movement in open ICR cells with compauter simulations, Inter. J. of Mass Spectrometry and Ion Processes 173 (1998) 81-90.

(Continued)

*Primary Examiner*—Bernard E Souw
*Assistant Examiner*—Michael J Logie
(74) *Attorney, Agent, or Firm*—TraskBritt

(57) ABSTRACT

An ion cyclotron spectrometer may include a vacuum chamber that extends at least along a z-axis and means for producing a magnetic field within the vacuum chamber so that a magnetic field vector is generally parallel to the z-axis. The ion cyclotron spectrometer may also include means for producing a trapping electric field within the vacuum chamber that includes at least a first section that induces a first magnetron effect that increases a cyclotron frequency of an ion and at least a second section that induces a second magnetron effect that decreases the cyclotron frequency of an ion. The cyclotron frequency changes induced by the first and second magnetron effects substantially cancel one another so that an ion traversing the at least first and second sections will experience no net change in cyclotron frequency.

24 Claims, 11 Drawing Sheets

U.S. PATENT DOCUMENTS

| | | | | |
|---|---|---|---|---|
| 7,495,211 | B2* | 2/2009 | Franzen et al. | 250/291 |
| 7,655,903 | B2* | 2/2010 | Zubarev et al. | 250/291 |
| 2004/0217284 | A1* | 11/2004 | Malek et al. | 250/291 |
| 2005/0178961 | A1* | 8/2005 | Beu et al. | 250/291 |
| 2007/0040114 | A1* | 2/2007 | Malek et al. | 250/294 |
| 2008/0099672 | A1* | 5/2008 | Kim et al. | 250/291 |

OTHER PUBLICATIONS

Mehdi Moini et al., Toward Quant. of Ion/Molecule Kinetics in Fourier Transform Ion Cyclotron Resonance Mass Spect., Inter. J. of Mass Spect. and Ion Proc., 87 (1989) 29-40.

P. Caravatti et al., The 'Infinity Cell': a New Trapped-ion Cell With Radiofrequency Covered Trapping Electrodes for Fourier . . . , Organic Mass Spect., vol. 26, 514-518 (1991).

Kevin L. Goodner et al., Quantitation of Ion Abundances in Fourier Transform Ion Cyclotron Resonance Mass Spect., 1998, Amer. Soc. for Mass Spect., 1204-1212.

Peter B. Grosshans et al., Theory of Ion Cyclotron Resonance Mass Spectometry: Resonant Excitation and Radial Ejection in . . . , Inter. J. of Mass Spect . . . , 100 (1990) 347-379.

Peter B. Grosshans et al., Cyclotron orbital radius determination in Fourier transform ion cyclotron resonance mass . . . , Inter. J. of Mass Spect. and Ion Pr . . . , 115 (1992) 1-19.

P. Kofel et al., Coupling of Axial and Radial Motions in ICR Cells During Excitation, Inter. J. of Mass Spectrometry and Ion Processes, 74 (1986) 1-12.

Alan G. Marshall, Milestones in Fourier transform ion cyclotron resonance mass spectrometry technique development, Inter. J. of Mass Spectrometry 200 (2000) 331-356.

Alan G. Marshall et al., Fourier transform ion cyclotron resonance detection: principles and experimental configurations, Inter. J. of Mass Spectrometry 215 (2002) 59-75.

Alan G. Marshall et al., Observation, Manipulation, and Uses for Magnetron Motion in Ion Cyclotron Resonance Mass Spectrometry, Physica Scripta. vol. T59, 155-164, 1995.

Alan G. Marshall et al., Fourier Transform Ion Cyclotron Resonance Mass Spectometry: A Primer, Mass Spectrometry Reviews, 1998, 17, 1-35.

Robert C. Dunbar, The Effect of Ion Position on ICR Signal Strength, International Journal of Mass Spectrometry and Ion Processes, 56 (1984) 1-9.

* cited by examiner

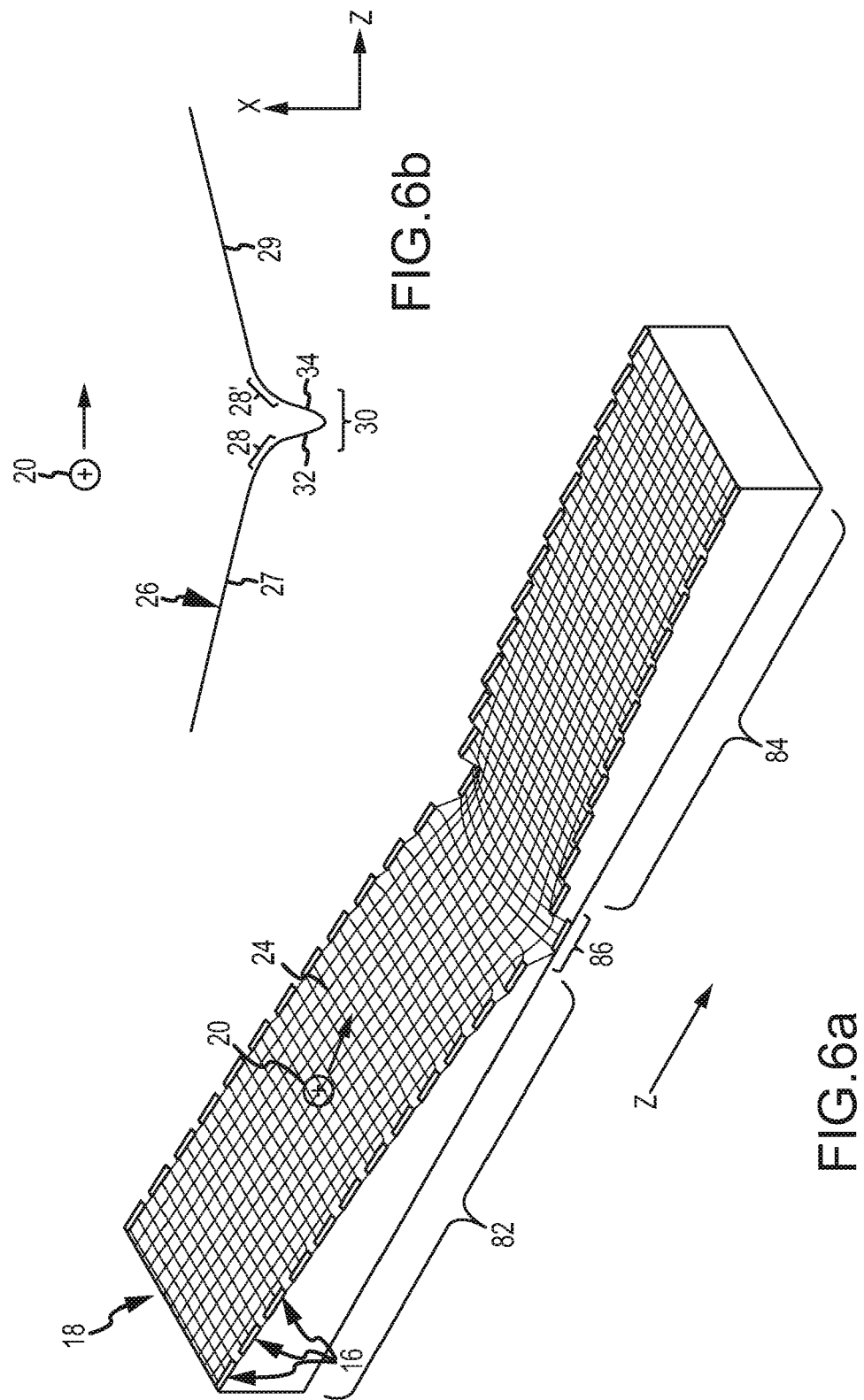

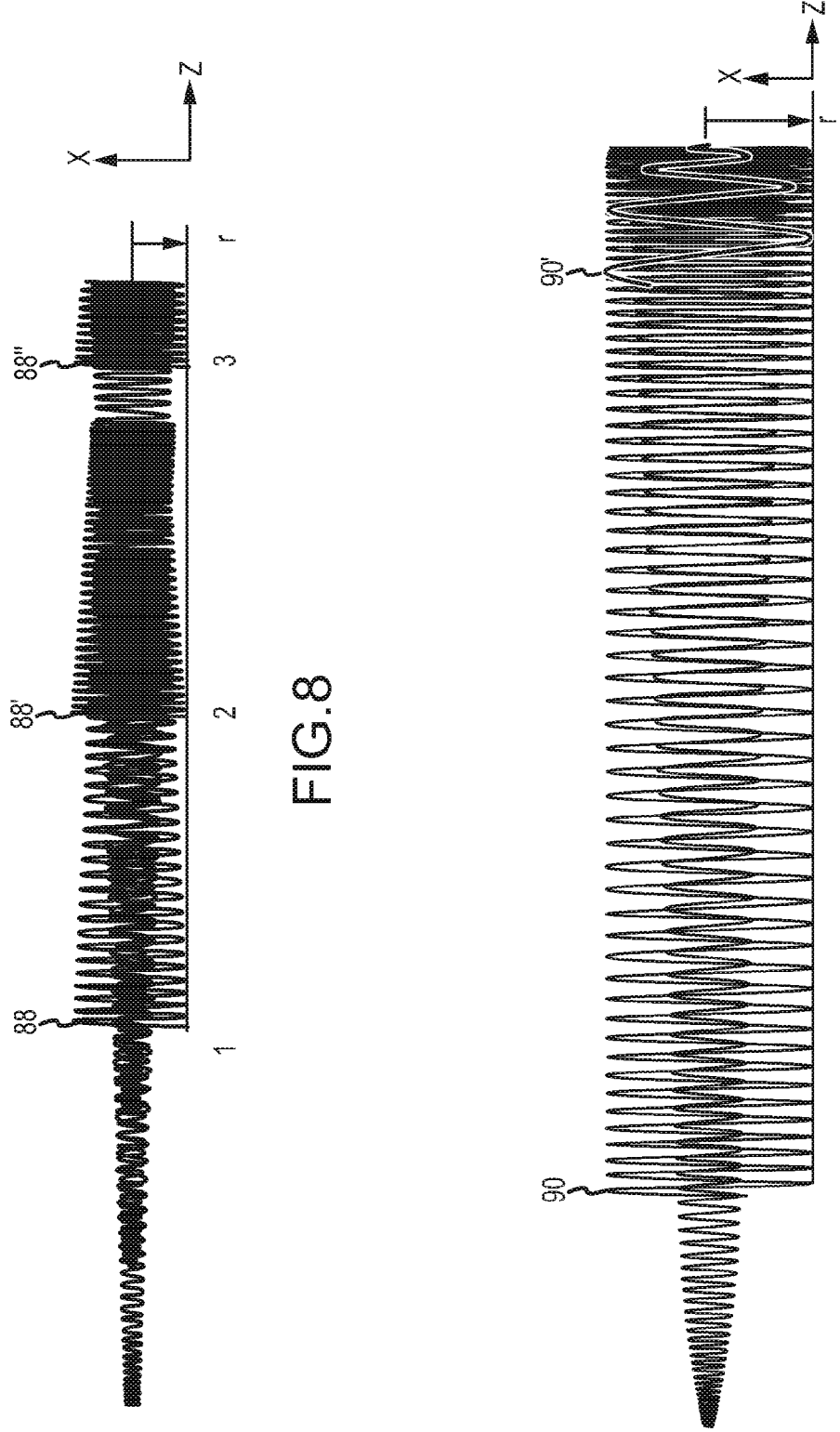

METHOD AND APPARATUS FOR ION CYCLOTRON SPECTROMETRY

GOVERNMENT RIGHTS

This invention was made with United States Government support under Contract No. DE-AC07-051D14517 awarded by the United States Department of Energy. The United States Government has certain rights in the invention.

TECHNICAL FIELD

This invention relates to mass spectrometry in general and, more specifically, to ion cyclotron mass spectrometry.

BACKGROUND

Ion cyclotron resonance mass spectrometry (ICR-MS) involves exciting ions at their ion cyclotron resonance (ICR) frequency and then observing the transient decay of the image currents induced on detection plates located adjacent the resonating ions. The electrical signals from the detection plates may be Fourier-transformed to produce frequency or mass spectrum data. Ion cyclotron resonance mass spectrometry that involves such Fourier transformations may also be referred to as Fourier-transform ion cyclotron resonance mass spectrometry, "FT-ICR-MS," "FTICR," or simply "FTMS."

Fourier transform ion cyclotron resonance mass spectrometry differs from other mass spectrometry techniques in that the ions are not detected by hitting a detector, but only by passing near detection plates. Additionally, the ion masses are not resolved in space or in time as with other techniques, but only in frequency. Stated another way, the different ions are not detected in different places as with sector instruments or at different times as with time-of-flight instruments.

A typical FTICR spectrometer involves a cube-shaped container or "cell" having three opposed sets of plates arranged to form the cube shape. The plates comprising the cell are positioned in a uniform magnetic field so that one pair of plates is orthogonal to the magnetic field, whereas the other two pairs of plates are generally parallel to the magnetic field. The three sets of plates are electrically connected to a voltage source that is operable to place various voltages on the plates to achieve various operational modes for the cell. The pair of plates that is orthogonal to the magnetic field is often referred to as the trapping plates. One of the other sets of opposed plates, commonly referred to as the excitation plates, is used to excite the ions, whereas the other opposed set of plates, commonly referred to as the detection plates, is used to detect the resonating ions.

In operation, a trapping voltage is placed on the trapping plates, creating an electric field within the cell. The combination of the electric and magnetic fields confine or trap the ions within the cell. Generally speaking, the ions are radially confined by the magnetic field and axially confined by the electric field. The ions oscillate between the trapping plates at a so-called z-axis trapping frequency, as the Cartesian z-axis is often selected as the axis that passes through the trapping plates. The electric and magnetic fields induce three general motions on the ions trapped within the cell: cyclotron motion, trapping motion, and magnetron motion. The magnetic field causes the ions to have a cyclotron frequency that is inversely proportional to their mass-to-charge (m/z) ratio. That is, ions with smaller m/z ratios will have higher cyclotron frequencies, whereas those with larger m/z ratios will have lower cyclotron frequencies. The ions trapped within the cell may be produced within the cell itself (e.g., by any of a wide range of ionization techniques), or may be produced external to the cell, then introduced into the cell by appropriate means.

Once a suitable number of ions is trapped within the cell, the cell may be switched to an excitation mode of operation, in which the ions are excited while remaining trapped within the cell. In the excitation mode of operation, an excitation signal (e.g., an alternating signal in the radio-frequency (RF) range) is applied on the two excitation plates. Generally speaking, the RF signals applied to the opposing excitation plates are 180° out of phase relative to each other. Because the excitation electric field is applied in addition to the trapping field, the ions will remain trapped within the cell (i.e., the ions are still subject to the trapping field), even as they are excited or energized due to the application of the excitation electric field. The RF excitation signal can be applied as a discrete frequency, as multiple discrete frequencies, or as a "chirp" in which the frequency is swept through a defined range of amplitudes and frequencies. Just as a tuning fork of the same frequency can gain energy from a similar tuning fork vibrating in a room, the ions trapped within the cell gain energy when the frequency of the voltage on the excitation plates is the same as the ion resonance cyclotron frequency. The increased energy of the ions causes the radii of the ion orbits to increase while the cyclotron frequency of the ions remains the same.

After the excitation event, the resonating ions of equivalent mass-to-charge (m/z) ratio are substantially in phase (i.e., coherent) and at sufficiently large orbits (i.e., their cyclotron radii have increased even though their cyclotron frequencies remain the same) that they can be detected by the detection plates. If the ions are positively charged, they attract electrons in the detection plates as they pass by, thus inducing a signal. If the ions are negatively charged, they repel the electrons in the detection plates. The signal between the two opposed detection plates has the same frequency as the cyclotron frequency of the resonating ions. The signal may then be amplified, digitized, and Fourier-transformed into mass spectrum data.

More recently, FTICR mass spectrometers have been developed wherein the cell takes the form of a Penning trap. Briefly, a Penning trap is a device that utilizes a linear magnetic field and a quadrupole electric field to confine ions or other charged particles within the trap. The quadrupole electric field may be generated by using a set of three electrodes, a ring and two end cap electrodes, for example. The ring and end cap electrodes are typically hyperboloids of revolution so that the electric field created between the electrodes has the desired quadrupole shape.

In theory, the effective cyclotron frequency of an ion trapped within the FTICR mass spectrometer will be independent of the position of the ion within the spectrometer as well as its cyclotron radius. According to the literature, the desired field within an FTICR is a quadrupole field. Unfortunately, however, this effect is only approached near the center or "saddle" of the quadrupole field. Ions located away from the center or saddle of the field are subject to various non-linearities that adversely affect their behaviors and the resulting data. For example, the trapping electric field produced by the end cap electrodes tends to shield or insulate ions located near the end cap electrodes from the excitation field. Consequently, ions located near the end cap electrodes are not excited to the same degree as ions located elsewhere. The shielding effect also makes it more difficult to detect excited ions near the end cap electrodes. The problem is made worse by the fact that the ions spend a substantial portion of time near the end cap electrodes, i.e., where the excitation and detection processes are least efficient.

Still other problems arise from the fact that most of the quadrupole field lines are not parallel to the magnetic field lines. The non-parallel fields induce magnetron effects on the ions, which are detrimental. For example, induced magnetron effects in cells utilizing a quadrupole field decrease the cyclotron frequency of the ions. While it is possible to correct the reduced cyclotron frequency (e.g., via calibration), the induced magnetron effects also lead to a loss of ion cloud coherence, which results in reduced resolution. An excessive number of ions are also lost to the cell in such systems, which limits resolution and detection limits. The induced magnetron effects, as well as non-linearities in the excitation and detection of the ions, also limits the effective mass-to-charge ratio range that can be observed for a given set of operational parameters. Consequently, Fourier transform ion cyclotron resonance spectroscopy systems have failed to realize their full potential.

SUMMARY OF THE INVENTION

Ion cyclotron spectrometry apparatus may include a vacuum chamber that extends at least along a z-axis. A plurality of opposed electrode pairs are positioned within the vacuum chamber so that they extend along the z-axis. The apparatus may also include means for producing a magnetic field within the vacuum chamber and between the plurality of opposed electrode pairs so that a magnetic field vector between the plurality of opposed electrode pairs is generally parallel to the z-axis. A voltage source electrically connected to the plurality of opposed electrode pairs applies a voltage function to the plurality of opposed electrode pairs so as to cause a substantially uniform electric field to be established between the plurality of opposed electrode pairs, the substantially uniform electric field including a plurality of potential lines that are substantially parallel in the region between the opposed electrode pairs.

Also disclosed is an electrode module that includes a generally ring-shaped field termination unit that defines an interior region therein. A first electrode is mounted within the interior region of the field termination unit. A second electrode is also mounted within the interior region of the field termination unit so that the first and second electrodes are positioned in generally parallel, spaced-apart relation. The combination of the field termination unit and the first and second electrodes is such that a voltage potential placed between the first and second electrodes will result in the formation of an electric field having potential lines that are substantially parallel throughout a region defined between the first and second electrodes.

Another embodiment of ion cyclotron spectrometry apparatus may include a vacuum chamber that extends at least along a z-axis. The apparatus may also include a magnetic field within the vacuum chamber so that a magnetic field vector is generally parallel to the z-axis. The apparatus is also provided with means for producing a trapping electric field within the vacuum chamber. The trapping electric field includes a first section that induces a first magnetron effect that increases the cyclotron frequency of an ion and a second section that induces a second magnetron effect that decreases the cyclotron frequency of the ion. The cyclotron frequency changes induced by the first and second magnetron effects substantially cancel one another so that the ion traversing the first and second sections will experience no net change in cyclotron frequency.

Yet another embodiment of an ion cyclotron spectrometer may include a vacuum chamber that extends at least along a z-axis. A plurality of opposed electrode pairs are positioned within the vacuum chamber so that they extend along the z-axis. The apparatus may also include means for producing a magnetic field within the vacuum chamber and between the plurality of opposed electrode pairs so that a magnetic field vector between the plurality of opposed electrode pairs is generally parallel to the z-axis. A voltage source electrically connected to at least some of the plurality of opposed electrode pairs applies at least a trapping voltage function to the plurality of opposed electrode pairs. The trapping voltage function results in the establishment of a trapping electric field between the plurality of opposed electrode pairs. The trapping electric field includes at least a first section that induces a first magnetron effect that increases a cyclotron frequency of an ion and at least a second section that induces a second magnetron effect that decreases the cyclotron frequency of the ion so that the ion traversing the first and second sections will experience no net change in cyclotron frequency.

Also disclosed is a method for performing ion cyclotron spectrometry that includes: providing ions within a vacuum chamber; producing a magnetic field within the vacuum chamber so that a magnetic field vector is generally parallel to a z-axis of the vacuum chamber; producing a trapping electric field within the vacuum chamber, the trapping electric field including at least a first section that induces a first magnetron effect that increases a cyclotron frequency of an ion and at least a second section that induces a second magnetron effect that decreases the cyclotron frequency of the ion so that the ion traversing the first and second sections will experience no net change in cyclotron frequency; exciting ions trapped by the magnetic and electric fields; and detecting excited ions.

Still another embodiment of an ion cyclotron spectrometer may include a vacuum chamber that extends at least along a z-axis. A plurality of opposed electrode pairs are positioned within the vacuum chamber so that they extend along the z-axis. The apparatus may also include means for producing a magnetic field within the vacuum chamber and between the plurality of opposed electrode pairs so that a magnetic field vector between the plurality of opposed electrode pairs is generally parallel to the z-axis. A voltage source electrically connected to at least some of the plurality of opposed electrode pairs applies at least a trapping voltage function to at least some of the plurality of opposed electrode pairs. The trapping voltage function results in the establishment of a trapping electric field between the plurality of opposed electrode pairs. The trapping electric field includes a field potential that, when taken in cross-section along the z-axis, includes at least one section having a concave curvature (i.e., electrostatic refractive field) and at least one section having a convex curvature so that ions traversing the field potential sections having the concave and convex curvatures experience a net magnetron effect on the cyclotron frequency that is substantially equal to zero.

Still yet another embodiment of an ion cyclotron spectrometer may include a vacuum chamber that extends at least along a z-axis and means for producing a magnetic field within the vacuum chamber so that a magnetic field vector is generally parallel to the z-axis. The spectrometer may also include means for producing a trapping electric field within the vacuum chamber that includes a field potential that, when taken in cross-section along the z-axis, includes at least one section that is concave down and at least one section that is concave up so that ions traversing the field potential sections experience a net magnetron effect on the cyclotron frequency that is substantially equal to zero.

Another method for performing ion cyclotron spectrometry may include: providing ions within a vacuum chamber;

producing a magnetic field within the vacuum chamber so that a magnetic field vector is generally parallel to a z-axis of the vacuum chamber; producing a trapping electric field within the vacuum chamber, the trapping electric field comprising a field potential that, when taken in cross-section along the z-axis, includes at least one section that is concave down and at least one section that is concave up so that ions traversing the field potential sections experience a net magnetron effect on the cyclotron frequency that is substantially equal to zero; exciting ions trapped by the magnetic and electric fields; and detecting excited ions.

Another embodiment of an ion cyclotron spectrometer may include a vacuum chamber that extends at least along a z-axis, along with means for producing a magnetic field within the vacuum chamber so that a magnetic field vector is generally parallel to the z-axis. The spectrometer may also include means for producing a trapping electric field within the vacuum chamber, the trapping electric field inducing compensated magnetron effects so that a net change in cyclotron frequency of an ion is substantially equal to zero.

In yet another embodiment, an ion cyclotron spectrometer may include a vacuum chamber that extends at least along a z-axis, along with means for producing a magnetic field within the vacuum chamber so that a magnetic field vector is generally parallel to the z-axis. The spectrometer may also include means for producing a trapping electric field within the vacuum chamber, the trapping electric field inducing compensated magnetron effects so that confined ions experience a net phase shift that is substantially equal to zero.

BRIEF DESCRIPTION OF THE DRAWINGS

Illustrative and presently preferred embodiments of the invention are shown in the accompanying drawings in which:

FIG. 6a is a computer-generated representation of a trapping electric field produced by a plurality of electrode pairs of a spectrometer;

FIG. 6b is a computer-generated representation of an electric field potential associated with the electric field of FIG. 6a;

FIG. 8 is a computer-generated simulation in the x-z plane of excitation radii of ions with the same m/z ratio;

FIG. 9 is a computer-generated simulation in the x-z plane of excitation radii of ions with different m/z ratios;

DETAILED DESCRIPTION OF THE PREFERRED EMBODIMENTS

Figure 1:
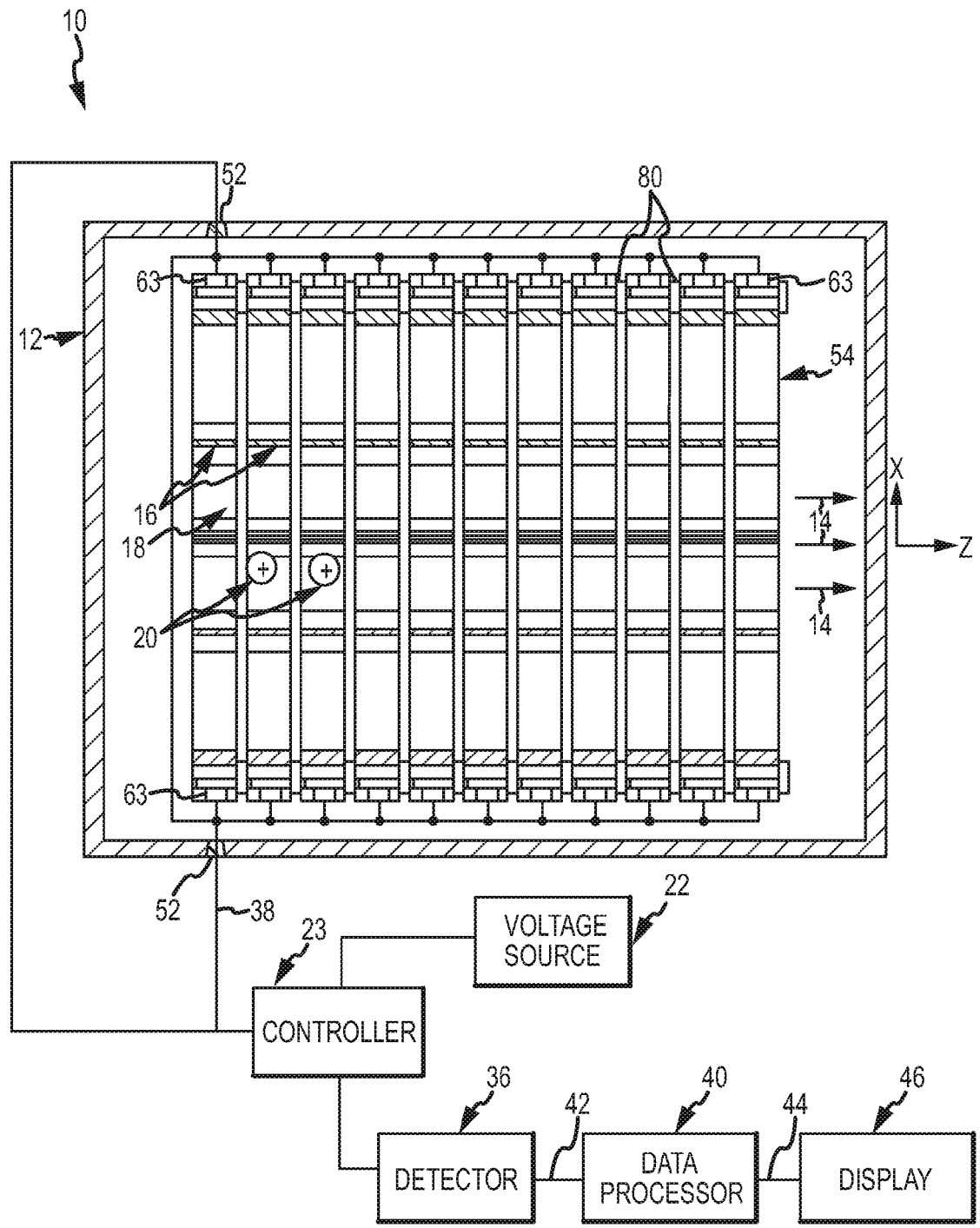
FIG. 1 is a cross-sectional schematic view in elevation of one embodiment of an ion cyclotron spectrometer.
Figure 2:
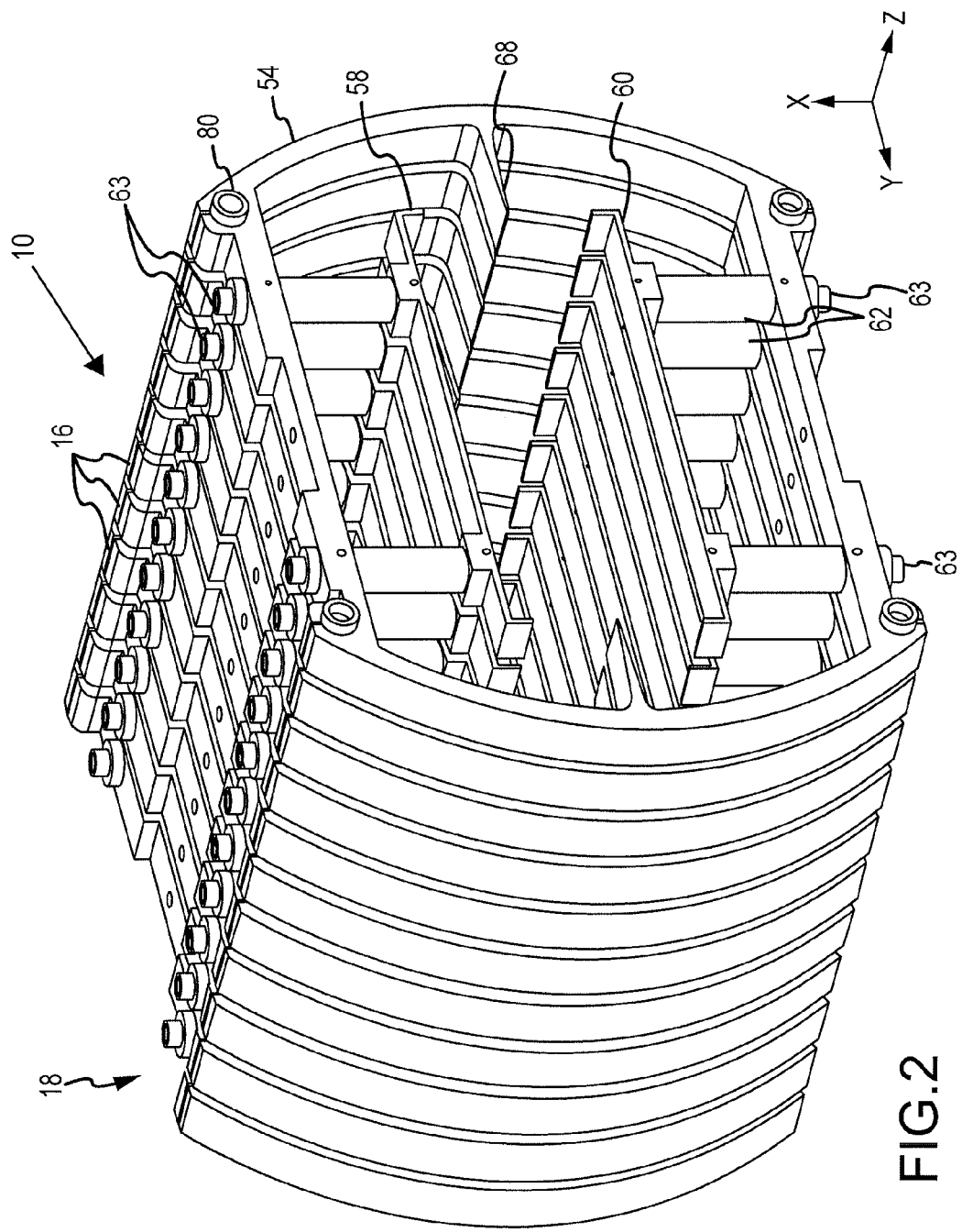
FIG. 2 is a perspective view of a plurality of electrode modules arranged in a stacked configuration to form a cell.

One embodiment of an ion cyclotron spectrometer 10 according to the teachings of the present invention is best seen in FIGS. 1 and 2 and may comprise a vacuum chamber 12 that is positioned within a magnetic field so that a magnetic field vector (represented by arrows 14) is generally aligned with a longitudinal or z-axis of vacuum chamber 12. A plurality of electrode pairs 16 are positioned within the vacuum chamber 12 so that the electrode pairs 16 extend generally along the longitudinal or z-axis of vacuum chamber 12. The plurality of electrode pairs 16 generally define a region or "cell" 18 within which ions 20 may be confined, excited, and detected in accordance with a variety of processes that will be described in further detail below. The various electrode pairs 16 that define cell 18 are electrically connected to a voltage source 22, such as, for example, via controller 23. Voltage source 22 may be operated to apply to the various electrode pairs 16 several different types of voltage functions (e.g., DC, RF, and combinations thereof) to allow the spectrometer 10 to be operated in the various operational modes (e.g., confinement, excitation, and detection modes) described herein.

Before proceeding with the description, it should be noted that a significant aspect of the present invention involves the recognition that substantial improvements in ion cyclotron resonance spectroscopy could be realized if an ion cyclotron resonance cell could be made to simulate, as nearly as possible, two infinite parallel plates. A cell simulating such a configuration would be capable of linear excitation and detection of ions, which would allow ion cyclotron resonance spectroscopy to actually realize all of the benefits and advantages that are theoretically possible in such spectroscopy. That is, in a cell that simulates such a configuration, ions within the cell would be consistently excited regardless of their locations between the plates. Likewise, the detection of the ions would be consistently uniform, again without regard to their locations between the plates. Of course, it is not practical to use a set of infinite parallel plates, because they cannot be arranged within a magnetic field that is practical to achieve. Even if this problem is addressed, there must be some way to trap the ions within a region of the cell without compromising the ideal linear gradient field.

The present invention recognizes that the need for infinite parallel plates can be dispensed with if the cell is provided with matched lateral linear electric fields that extend in the same direction as the magnetic field. That is, because the magnetic field acts to limit the motions of the ions to cyclotron orbits in the x,y plane (assuming a z-axis that is parallel to the magnetic field), an apparent (to the ions) laterally infinite linear gradient field can be induced within a cell that is not much longer than the distance between the plates.

In addition, the present invention recognizes that the design of the cell can be broken down into a DC problem and an AC problem. The excitation and detection of ions is an AC problem, in that they require time-varying electric fields. Ion trapping, on the other hand, is a DC problem. That is, the electric field must have a potential "well" in order to trap the ions between the plates so that they can be excited and detected. The embodiments of the present invention solve these problems by slicing or dividing the cell into a plurality of opposed electrode pairs 16 that extend along a magnetic field. Appropriate DC and AC voltages can then be provided to the opposed electrode pairs 16 to provide for the trapping, excitation, and detection modes of operations described herein.

For example, when the spectrometer 10 is operated in a confinement or trapping mode, voltage source 22 is operated so as to apply to the various electrode pairs 16 a trapping voltage function, which may comprise a time-invariant or DC voltage. The application of the trapping voltage function to the various electrode pairs 16 results in the creation of a trapping electric field 24 (FIG. 6a) within the cell 18, i.e., in the region located between the various opposed electrode pairs 16. The trapping electric field 24, in combination with the magnetic field, functions to contain or trap ions 20 within the cell 18 of spectrometer 10.

Referring now primarily to FIGS. 6a and 6b, one embodiment of a trapping electric field 24 (FIG. 6a) comprises a field potential 26 (FIG. 6b) that, when taken in cross-section along the z-axis of the vacuum chamber 12 (FIG. 1), includes at least one convex section 28 having a convex "curvature" (i.e., electrostatic refractive field) and at least one concave section 30 having a concave "curvature." In the embodiment shown and described herein, the convex section 28 and concave section 30 are located between two side portions or "wings" 27 and 29. As will be described in greater detail below, ions 20 oscillating between the wings 27 and 29 and traversing the convex section 28 and concave section 30 of trapping electric field 24 experience a net magnetron effect on the cyclotron frequency that is substantially equal to zero. That is, any magnetron effect on the cyclotron frequency that is induced in the ions 20 as they move in trapping electric field 24 is compensated by the configuration of the trapping electric field 24 and resulting field potential 26.

With specific reference now to the embodiment illustrated in FIGS. 6a and 6b, the field potential 26 of trapping electric field 24 comprises two convex sections, i.e., first and second convex sections 28 and 28', between which is located the concave section 30. The magnetron effect compensation occurs as follows: as a result of the forces exerted on ions 20 by the trapping electric field 24 and the magnetic field, ions 20 will generally follow reciprocating paths (i.e., along the z-axis) between the wings 27 and 29. That is, the ions 20 will travel back and forth between the wings 27 and 29, traversing the convex section 28 and concave section 30 as they do so. The magnetron effect induced by the convex sections 28, 28' leads to an increase in the cyclotron frequency, whereas the magnetron effect induced by the concave section 30 leads to a decrease in the cyclotron frequency. Thus, the combined magnetron effects are such that the changes in cyclotron frequency substantially cancel each other. Consequently, the ion 20 experiences a net magnetron effect that is zero (or substantially equal to zero) each time it fully crosses or traverses the convex section 28 and concave section 30 of the field potential 26 of trapping electric field 24. Hence, it is possible to detect the "true" cyclotron frequency (i.e., "true" meaning substantially equal to the actual cyclotron frequency) of the ions for a given magnetic field strength.

Another way to view the induced magnetron effects is that the electrostatic component in the convex section 28 of field potential 26 results in an increase in cyclotron frequency. On the other hand, the electrostatic component in the concave section 30 results in a decrease in cyclotron frequency. If the electrostatic components of the convex section 28 and concave section 30 are matched (or nearly so), the overall magnetron effect will be reduced or eliminated (i.e., the magnetron effect will be compensated), with the effect that the ions 20 will experience substantially no net change in cyclotron frequency. Stated another way, the trapping electric field 24 includes at least a first convex section 28 that induces a first magnetron effect that increases a cyclotron frequency of an ion 20 and at least a second concave section 30 that induces a second magnetron effect that decreases the cyclotron frequency of an ion 20, so that an ion 20 traversing the first convex section 28 and the at least a second concave section 30 will experience substantially no net change in cyclotron frequency. Thus, the observed cyclotron frequency will be the true or substantially equal to the true cyclotron frequency of the ions 20 in a magnetic field of a given strength.

As will be described in greater detail below, any of a wide range of trapping electric fields may be utilized in the present invention so long as the configuration of the electric field is such that the magnetron effect is compensated, i.e., so that ions 20 experience no net change in cyclotron frequency. One type of trapping electric field 24 that is effective in compensating for magnetron effect (i.e., wherein the net magnetron effect induced on ions 20 traversing the trapping electric field 24 is substantially equal to zero) is a trapping electric field 24 that has a field potential 26 that follows the $n^{th}$ root power law. By way of example, in the embodiment shown and described herein, the field potential 26 of trapping electric field 24 substantially follows a curvature described by a second root power law (e.g., $10^{1/2}$). In another embodiment, the field potential 26 of trapping electric field 24 follows a curvature described by a third root power law (e.g., $10^{1/3}$).

The spectrometer 10 may also comprise a detector 36 (as shown in FIG. 1) that is electrically connected to at least some of the opposed electrode pairs 16. Detector 36 detects electrical signals 38 induced in the various opposed electrode pairs 16 by resonating ions 20 trapped within cell 18. Detector 36 produces output signals 42 that are related to the resonating ions 20. A data processor 40 operatively associated with detector 36 may process output signals 42 produced by detector 36 to produce processed data 44. For example, in one embodiment, data processor 40 may be provided with a Fourier transform algorithm suitable for performing a Fourier transform on output signals 42 from the detector 36. Accordingly, the processed data 44 will comprise Fourier-transformed data. Processed data 44 from data processor 40 may thereafter be presented in a suitable display 46 or any other device or system that will allow a user to interpret the processed data 44.

The ion cyclotron spectrometer 10 may be operated as follows to perform Fourier transform ion cyclotron resonance spectroscopy. Alternatively, other types of ion cyclotron spectrometry could be performed, as will be described in further detail herein. As a first step, vacuum chamber 12 may be positioned within a magnetic field so that the magnetic field vector 14 is generally parallel with the z-axis of vacuum chamber 12. See FIG. 1. The magnetic field should be of sufficient strength so that, when combined with the trapping electric field 24, ions 20 will be confined or trapped within the cell 18. By way of example, in one embodiment, a magnetic field having a strength of about 7 tesla in the cell 18 will provide acceptable results, although magnetic fields having other strengths (i.e., higher or lower) may also be used. Vacuum chamber 12 should also be evacuated and provided with ions 20 to be studied.

The ions 20 to be studied may be produced in accordance with any of a wide variety of processes that are now known in the art or that may be developed in the future. For example, in one embodiment, the ions 20 are produced by a suitable ionizer (not shown) located outside the cell 18, then conducted into the cell 18 by an ion "gate" or guide. Alternatively, ions 20 may be produced within the cell 18 itself, such as, for example, by ionizing sample material previously provided within cell 18. In any event, once ions 20 have been introduced into the cell 18, voltage source 22 is operated to place a trapping voltage function on at least some of the various opposed electrode pairs 16. As a result, the trapping electric field 24 (for example, an electric field having a field potential in accordance with the $n^{th}$ root power law) illustrated in FIG. 6a will be created in the cell 18.

As may be appreciated with reference to FIG. 6b, ions 20 confined by the trapping electric field 24 will travel back and forth (e.g., along the z-axis) between wings 27 and 29 of field potential 26 of cell 18, repeatedly traversing the convex sections 28, 28' and concave section 30 as they do so. The magnetron effect induced in the ions 20 will be compensated with each traversal of the convex sections 28, 28' and concave section 30.

At the appropriate time, the voltage source 22 may be operated in an excitation mode in order to excite the ions 20 contained within the cell 18. In operating in the excitation mode, voltage source 22 places an excitation voltage function on at least some of the opposed pairs of electrodes 16. It should be noted that the excitation voltage function is provided in addition to the trapping voltage function so that ions 20 can be excited but still remain trapped within the cell 18. Generally speaking, the excitation voltage function will cause an alternating electric field to be established in the region between the opposed pairs of electrodes 16 that will be effective in causing ions 20 within the cell 18 to become excited (i.e., to gain energy).

During the excitation mode of operation, ions 20 within cell 18 will continue to move generally axially back and forth (i.e., in a reciprocating manner) within cell 18, with their magnetron effects being compensated each time the ions 20 traverse the convex sections 28, 28' and concave section 30 of field potential 26 (FIG. 6b). In addition to the generally axial or reciprocating motion followed by ions 20 within cell 18, the orbits or cyclotron radii of the ions 20 will increase as the ions 20 continue to absorb energy from the alternating (e.g., RF) excitation electric field.

As will be described in further detail herein, the excitation voltage function may comprise any of a wide range of functions suitable for exciting the ions 20 of interest. For example, in one embodiment, the excitation voltage function may be selected to cause the alternating electric field to vary at a fixed frequency or at multiple fixed frequencies. Alternatively, the excitation voltage function may cause the alternating electric field to vary across a predetermined frequency range, also known as a "chirp" function.

Figure 7:
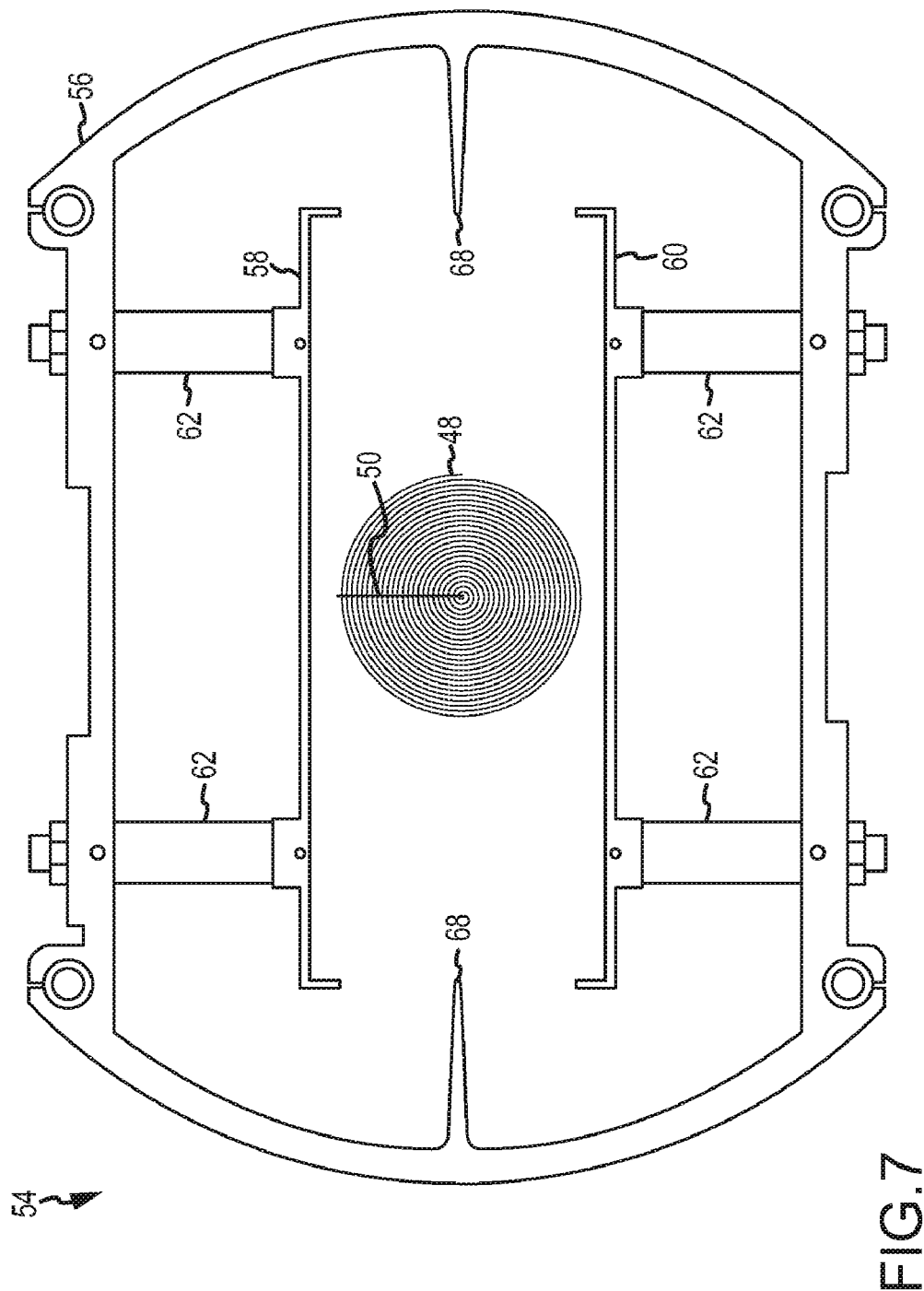
FIG. 7 is a computer-generated simulation of an excitation path followed by an ion located between an opposed electrode pair.

When the ions 20 are exposed to the excitation electric field, they resonate, continually gaining energy, which results in an increase in the cyclotron radius of the ions 20. The increase in the cyclotron radius is schematically illustrated in FIG. 7, which is a computer simulation that depicts a spiral path 48 followed by a resonating ion 20 trapped within cell 18 (see FIG. 1). As the ions 20 resonate within the cell 18, they also follow reciprocating axial paths (i.e., generally back and forth along the z-axis) within vacuum chamber 12. As a result, the resonating ions 20 repeatedly traverse the convex sections 28, 28' and concave section 30 of the field potential 26 (FIG. 6b).

Because the trapping electric field 24 results in a no-net magnetron effect as resonating ions 20 repeatedly traverse the convex sections 28, 28' and concave section 30, the net cyclotron frequency of the resonating ions 20 remains unchanged. Computer simulations confirm this fact as indicated by the straight vertical line 50 on the spiral path 48 for an exemplary resonating ion 20. More specifically, and as will be described in greater detail below, the line 50 connects the locus of points that correspond to the position of the exemplary resonating ion 20 at intervals of the time period for the cyclotron frequency of the ion 20. Because the points occur at the same angular position on the spiral path 48, i.e., because line 50 is substantially straight, the resonating ion 20 is revolving at the true cyclotron frequency for the ion 20.

After a suitable period of excitation, ions 20 trapped within the cell 18 may be detected by detector 36 (e.g., via controller 23, as will be described in greater detail below). In one embodiment, detector 36 detects electrical signals induced on the various opposed pairs of electrodes 16 by the movement of the resonating ions 20. The data processor 40 may be used to process output signals 42 from detector 36 in accordance with a transform algorithm to produce processed data 44. By way of example, in an embodiment wherein the data processor 40 is provided with a Fourier transform algorithm, processed data 44 may comprise Fourier-transformed data. The Fourier-transformed data may then be presented on display 46.

A significant advantage of the spectrometer 10 according to the present invention relates to the trapping electric field 24. More specifically, the trapping electric field 24 effectively compensates for magnetron effects induced in the ions 20 as they move within cell 18. That is, ions 20 traversing the trapping electric field 24 experience a net magnetron effect on the cyclotron frequency that is substantially zero. Many advantages and benefits flow from the compensated magnetron effects.

For example, because the net magnetron effect is substantially zero, the ions 20 will resonate at their true (or substantially equal to their true) cyclotron frequency, thereby simplifying the excitation and detection of the resonating ions 20. Moreover, because the observed frequency of the ions 20 is substantially identical to the true cyclotron frequency, the calibration process for the Fourier transform mass spectrometry process is greatly simplified. That is, there is no need to take into account a reduced cyclotron frequency resulting from magnetron effects induced by the trapping electric field 24.

Another benefit of the present invention is that all ions 20 of the same type will be excited to the same radius throughout the cell 18, as best seen in FIG. 8. Moreover, ions 20 of different types will also all be excited to the same radii, as best seen in FIG. 9. Consequently, the output signals 42 (e.g., amplitude or area of the peaks) from detector 36 will more accurately reflect the actual number of ions 20 within the cell 18, thereby allowing more accurate isotope ratio and other quantitative measurements to be made. In addition, the ion "clouds" will remain coherent for a longer period of time (relative to conventional ion cyclotron resonance spectroscopy systems), thereby improving resolution and mass accuracy.

Yet another benefit associated with the field potential 26 of the trapping electric field 24 is that the ions 20 travel faster (along the z-axis) through the convex sections 28, 28' and concave section 30 than through the side portions or "wings" 27 and 29 of field potential 26 (FIG. 6b). Accordingly, the ions 20 spend substantially more time in either of the side portions 82 and 84 than the middle portion 86 of the trapping electric field 24, where the cyclotron frequency is most consistent (FIG. 6a).

Still other advantages are associated with the overall configuration of the opposed pairs of electrodes 16 and the fact that no end-cap electrodes are required. For example, the electrode configuration of the spectrometer 10 is highly effective in simulating a cell defined by infinite parallel electrodes. As a result, the excitation and detection processes are substantially linear. That is, there are no end cap electrodes to shield the ions 20 from the excitation field and to prevent the ions 20 from being easily detected (due to the presence of the trapping electric field 24 emanating from the end cap electrodes). Consequently, a spectrometer 10 according to the present invention will realize increased sensitivity and lower detection limits compared to conventional systems.

Still other advantages derive from the parallel plate design of the present invention. For example, the ions 20 tend to be more evenly distributed along the length of the cell 18, which may reduce space-charge effects. In addition, the "open" configuration provided by the opposed pairs of electrodes 16 also provides convenient pathways for introducing ions into the cell 18 and allows for improved vacuum pumping.

Having briefly described one embodiment of an ion cyclotron resonance mass spectrometer 10 according to the present invention, as well as some of its more significant features and advantages, various exemplary embodiments of the spectrometer 10 and methods for performing mass spectrometry will now be described in detail.

Referring back now to FIGS. 1 and 2 simultaneously, one embodiment of an ion cyclotron resonance spectrometer 10 may comprise a vacuum chamber 12 that is configured to receive or contain the various components and devices described herein. In one embodiment, vacuum chamber 12 is also configured to be positioned within a magnetic field so that a magnetic field vector 14 is generally parallel to the longitudinal or z-axis of the vacuum chamber 12. In this regard, it should be noted that it is not the particular orientation per se of the vacuum chamber 12 with respect to the magnetic field that is important, but rather the orientations (with respect to the magnetic field vector 14) of the opposed pairs of electrodes 16 provided within the vacuum chamber 12. That is, the plurality of electrode pairs 16 should be positioned within the vacuum chamber 12 and the vacuum chamber 12 positioned within the magnetic field, so that plurality of opposed electrode pairs 16 extend generally along magnetic field vector 14, as best seen in FIG. 1.

The plurality of electrode pairs 16 generally define a region or cell 18 within which ions 20 are confined, excited, and detected in order to perform, for example, Fourier-transform ion cyclotron resonance mass spectrometry (FTICR-MS). Alternatively, other processes may be performed using the components and devices shown and described herein.

In one embodiment, vacuum chamber 12 may comprise a generally elongate, cylindrically shaped structure that extends along the z-axis of an orthogonal x,y,z coordinate system, as best seen in FIG. 1. Alternatively, vacuum chamber 12 may comprise other shapes and configurations. In addition to containing the various opposed pairs of electrodes 16, vacuum chamber 12 may also be configured to operate or interface with any of a wide variety of ancillary components and devices (not shown), such as vacuum pumps, pressure sensors, ionization chambers, and the like, that may be required or desired in any particular application. In addition, vacuum chamber 12 may also be provided with one or more access ports 52 or "feed-throughs" to allow various external devices and systems, such as for example, voltage source 22 and detector 36, to be operably connected to the appropriate components (e.g., the opposed electrode pairs 16) housed within vacuum chamber 12. Vacuum chamber 12 may also be configured to be operatively associated with a separate ionization device (not shown) to allow ions 20 from the ionization device to be conducted to the cell 18.

However, because vacuum chambers, as well as the various ancillary components and devices that may be required or desired for performing ion cyclotron resonance spectroscopy, are well known in the art and could be readily provided by persons having ordinary skill in the art after having become familiar with the teachings provided herein, the particular vacuum chamber 12 and various ancillary components and devices that may be utilized in one embodiment of the invention will not be described in further detail herein.

As already mentioned, vacuum chamber 12 may be configured to be positioned within a magnetic field so that the magnetic field vector (illustrated by arrows 14 in FIG. 1) is generally parallel to the longitudinal or z-axis of the vacuum chamber 12. The magnetic field may be produced by a suitable magnet, such as a superconducting magnet (not shown), located outside vacuum chamber 12. If an external magnet is used, vacuum chamber 12 should be constructed from a non-magnetic material (e.g., non-magnetic stainless steel) so as to avoid diminishing or perturbing the strength of the magnetic field within vacuum chamber 12. Alternatively, other arrangements are possible, as would become apparent to persons having ordinary skill in the art after having become familiar with the teachings provided herein. Consequently, the present invention should not be regarded as limited to any particular arrangement for the vacuum chamber 12 or for the production of the magnetic field within cell 18.

Before proceeding with the description, it should be noted that the magnetic field should be made as uniform as possible within the region defined by the cell 18, as non-uniformities in the magnetic field may reduce the coherence of the excited ions 20. In addition, the strength of the magnetic field should be commensurate with the strengths generally preferred in ion cyclotron resonance spectrometry and suitable for confining ions 20 when used in conjunction with the strength of the trapping electric field 24 (FIG. 6a) contained within the cell 18. Consequently, the present invention should not be regarded as limited to a magnetic field having any particular strength or range of strengths. However, by way of example, in one embodiment, the magnetic field within the vacuum chamber 12 has a strength of about 7 tesla.

Figure 3:
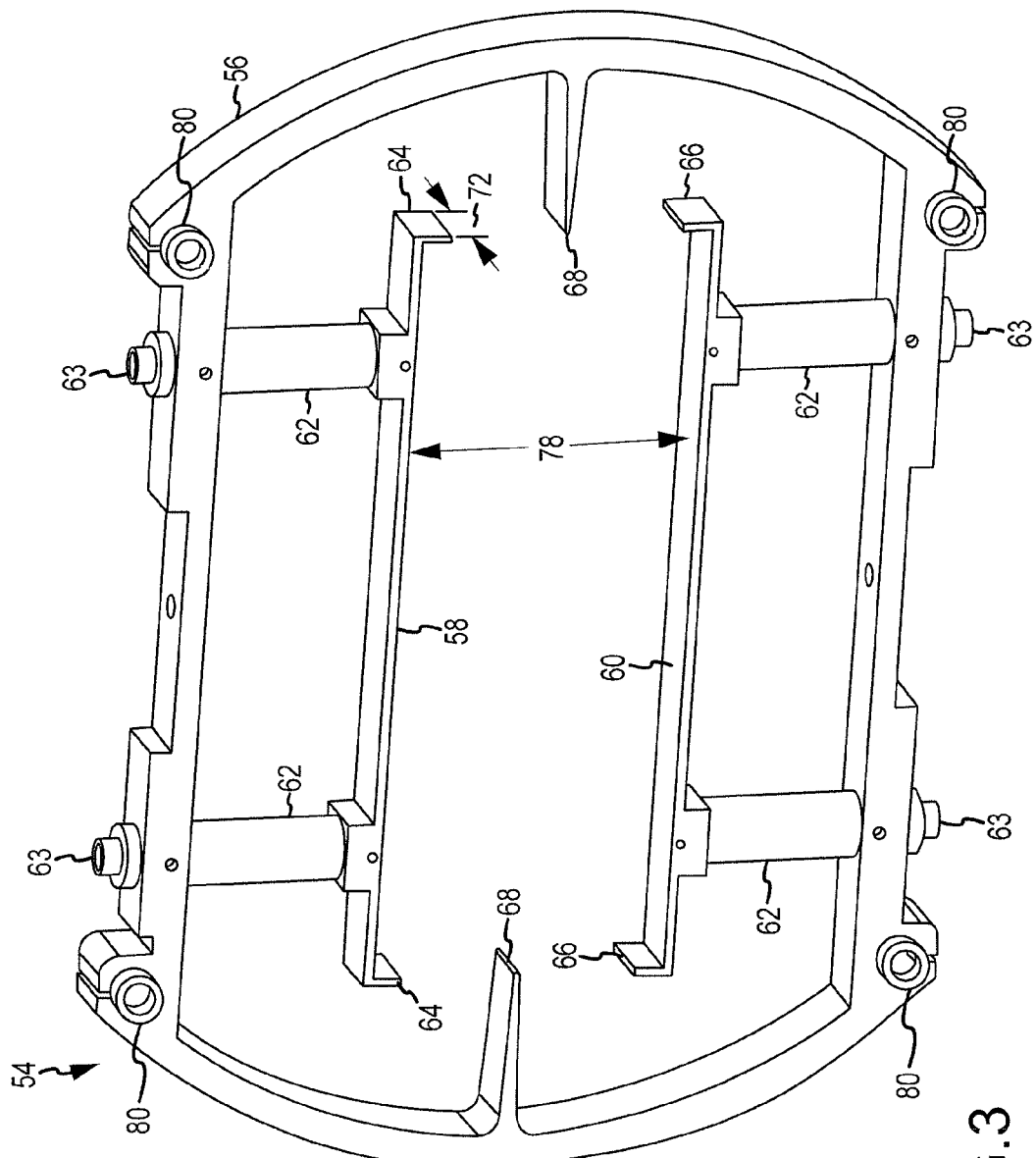
FIG. 3 is a perspective view of a single electrode module of the type illustrated in FIG. 2.
Figure 4:
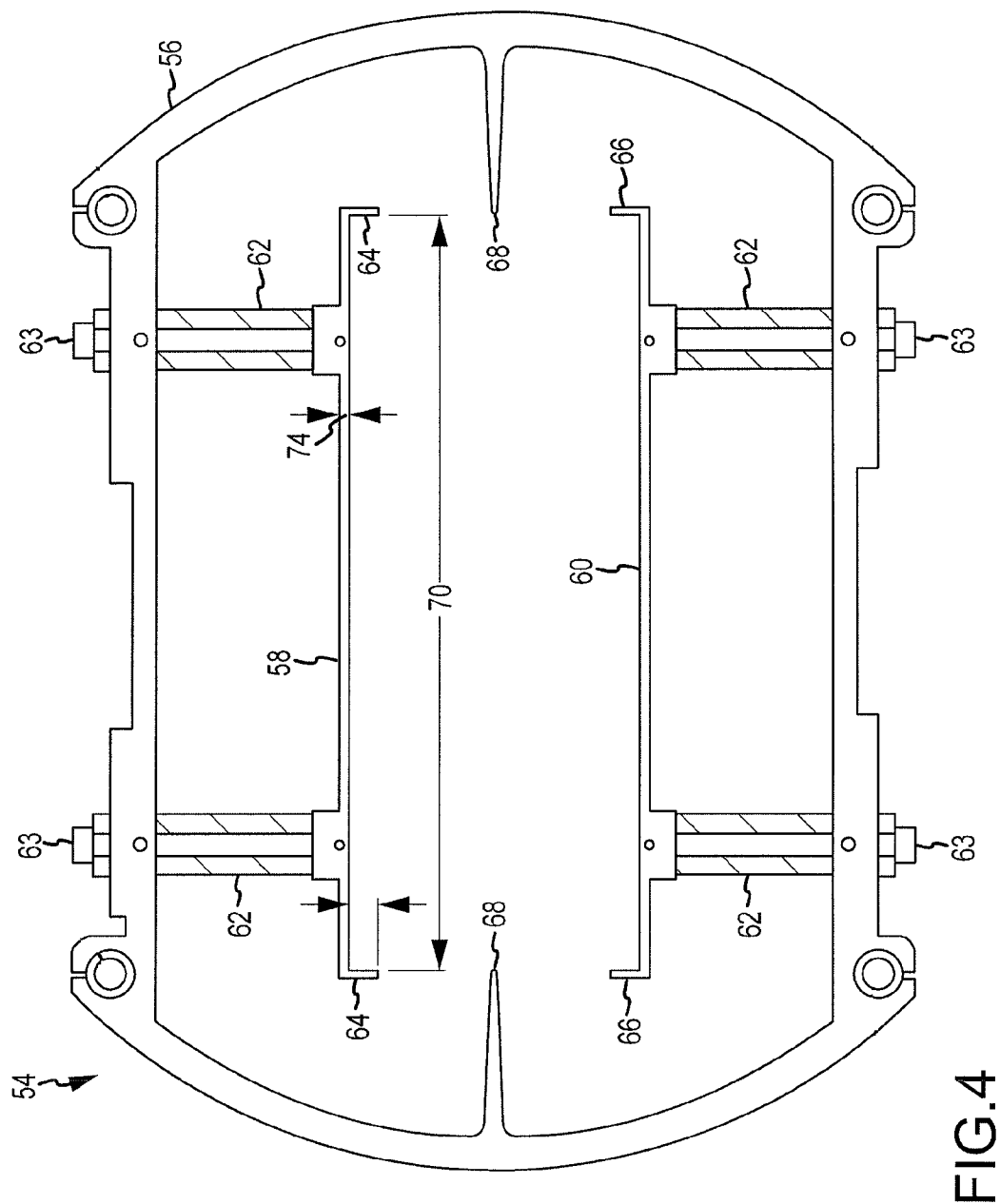
FIG. 4 is a side view in elevation of a single electrode module of the type illustrated in FIG. 2.

Referring now to FIGS. 1-4, each opposed pair of electrodes 16 may comprise an electrode assembly or module 54, a plurality of which may be assembled or "stacked" in side-by-side relationship to form the cell 18, as best seen in FIGS. 1 and 2. Each electrode assembly or module 54 may comprise a generally ring-shaped field termination unit 56 within which are mounted a pair of opposed electrodes 58 and 60. Alternatively, the field termination units 56 need not be ring shaped but could comprise other shapes and configurations as well. Consequently, the present invention should not be regarded as limited to field termination units 56 having the ring shape illustrated herein. Each electrode 58, 60 may be mounted to the field termination unit 56 by a pair of insulating support posts 62 so that the electrodes 58 and 60 are held in generally parallel, spaced-apart relation in the manner best seen in FIGS. 3 and 4. In the embodiment shown and described herein, the insulating support posts 62 are hollow and are sized to receive screws 63 that are used to fasten or secure the electrodes 58, 60 to the field termination units 56. The screws 63 may also provide a convenient means to electrically connect the electrodes 58, 60 to the voltage source 22 and detector 36, although other arrangements are possible. Each electrode 58 and 60 may be provided with a pair of inwardly turned ends 64, 66, respectively. Field termination unit 56 may also be provided with a pair of inwardly projecting fins 68 located at positions about midway between the electrodes 58 and 60, as best seen in FIGS. 3 and 4.

In addition to providing a convenient mounting arrangement for the electrodes 58 and 60, certain structural features of the electrode module 54 and electrodes 58 and 60 aid in the creation and establishment of a highly uniform electric field (e.g., trapping electric field 24) in the region between the two electrodes 58 and 60. See FIGS. 5a and 5b. More specifically, and as will be described in greater detail below, the combination of the ring-shaped field termination unit 56, the fins 68, and the inwardly turned ends 64, 66 of electrodes 58, 60 helps to "terminate" the trapping electric field 24 in the regions near the ends of the electrodes 58, 60 so that potential lines 61 of trapping electric field 24 are substantially parallel in the entire region between the electrodes 58 and 60. Consequently, the linear electrostatic AC fields "appear" to the ions 20 to be infinite.

The electrodes 58 and 60 provided within electrode module 54 may be substantially identical to one another and, in one embodiment, may comprise generally elongate, slender members as best seen in FIGS. 2-4. While the electrodes 58 and 60 may comprise a wide range of sizes depending on the particular application, in one embodiment, each electrode 58 and 60 may have a length 70 of in a range of about 50 mm to about 90 mm (about 78 mm preferred), a width 72 in a range of about 3 mm to about 12 mm (about 7 mm preferred), and a thickness 74 in a range of about 0.5 mm to about 2 mm (about 1 mm preferred). The distance 78 separating the opposed electrodes 58 and 60 may be in a range of about 20 mm to about 50 mm (about 30 mm preferred).

It should be noted that the various dimensions for the electrodes 58, 60 may be interrelated. That is, a change in one dimension may require a change in another dimension in order to result in satisfactory operation or to optimize performance. For example, in order to have the electrodes 58 and 60 simulate as closely as possible infinite, parallel plates, the length 70 of electrodes 58 and 60 should be at least twice that of the distance 78 that separates them. In one embodiment, the length 70 of electrodes 58, 60 is about 2.6 times the distance 78 separating the electrodes 58, 60. Of course, electrodes 58 and 60 having even longer lengths would be even more desirable. However, the maximum electrode length 70 will usually be dictated by other factors, such as, for example, the size of the vacuum chamber 12 and/or the size of the magnet used to produce the magnetic field.

The electrodes 58 and 60 may be fabricated from any of a wide range of materials suitable for the particular application. By way of example, in one embodiment, the electrodes 58 and 60 are fabricated from "grade 2" titanium, although other materials, such as 316 stainless steel, could also be used. Similarly, the field termination unit 56 may be fabricated from any of a wide range of materials suitable for the particular application. By way of example, in one embodiment, the field termination unit 56 comprises an electrically conductive member and is manufactured from grade 2 titanium. The insulating support posts 62 comprise electrically insulating members and are manufactured from machinable glass ceramic material, such as MACOR®, available from Corning Incorporated, New York. Screws 63 are fabricated from titanium. Alternatively, other materials may be used for these components, as would become apparent to persons having ordinary skill in the art after having become familiar with the teachings provided herein.

Figure 5A:
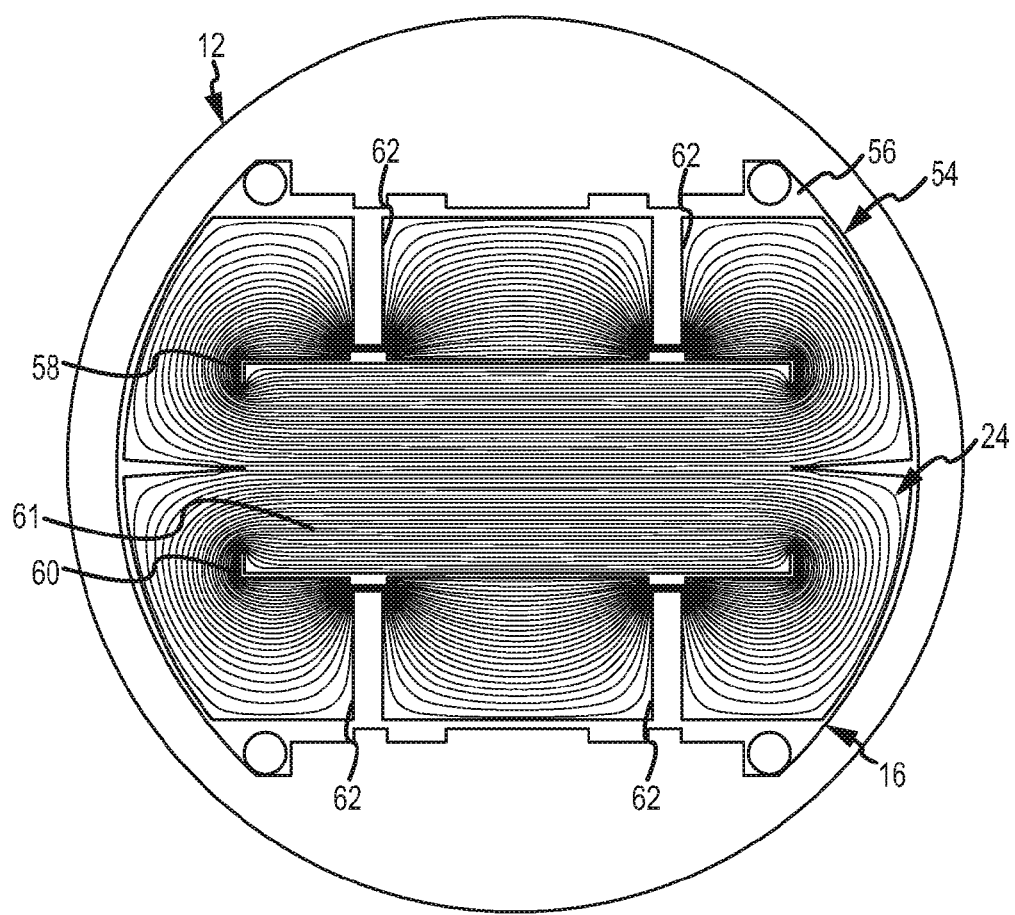
FIG. 5a is a computer-generated representation of electric field potential lines formed between an electrode pair with no static charge residing on the insulating support posts.
Figure 5B:
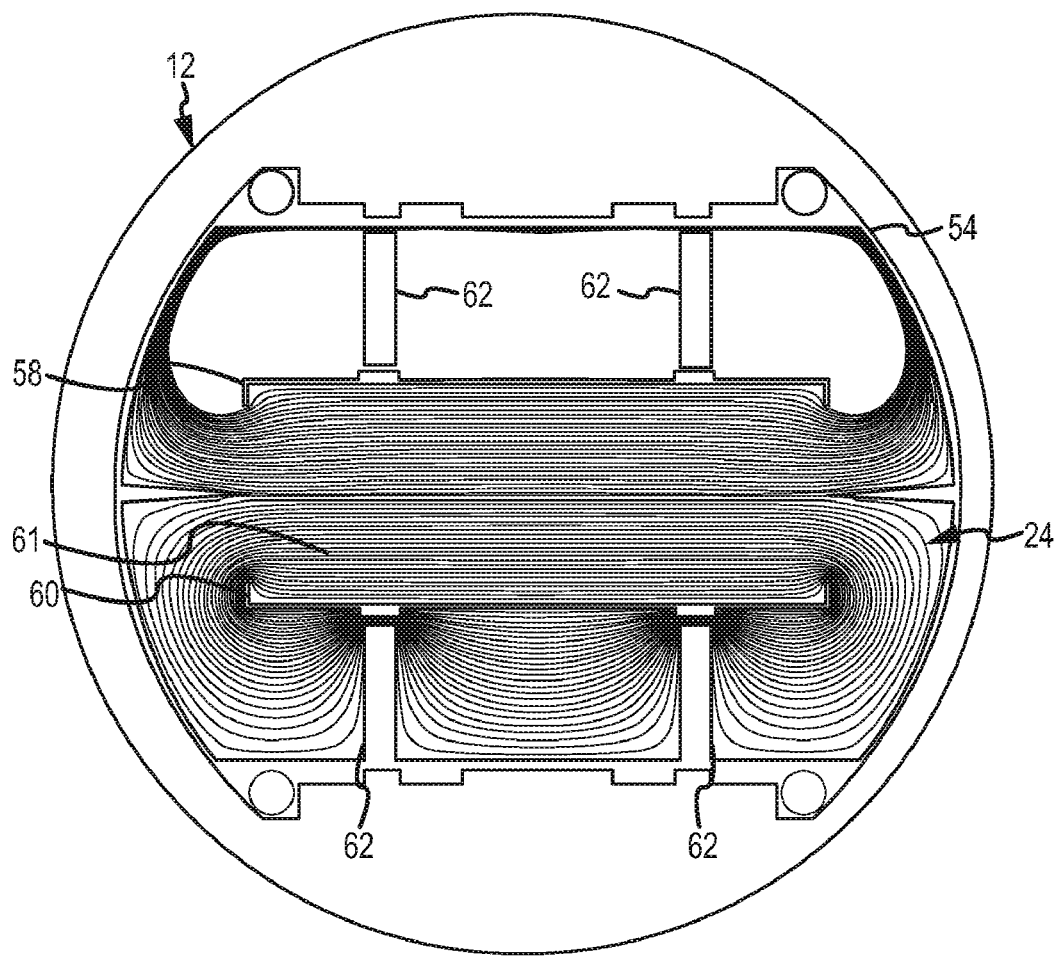
FIG. 5b is a computer-generated representation of electric field potential lines formed between an electrode pair with a static charge residing on an upper pair of insulating support posts, but no static charge residing on a lower pair of insulating support posts.

As mentioned above, the electrode modules 54 are sized and configured so that the trapping electric field 24 is substantially uniform in the region between opposed electrodes 58 and 60, so that the potential lines 61 of trapping electric field 24 are substantially parallel in the region between the opposed electrodes 58 and 60, as best seen in FIGS. 5a and 5b. A suitable design for the electrode modules 54 may be developed with the aid of a computer program to model the trapping electric field 24 for a given configuration of electrode module 54. Alternatively, other design methodologies and design tools may be used. By way of example, in one embodiment, the computer program may comprise a program commercially known as "SIMION® 7.0," which is available from Scientific Instruments Services, Inc., 1027 Old York Road, Ringoes, N.J. 08551 (USA). The trapping electric field 24 depicted in FIGS. 5a and 5b was generated by the SIMION® 7.0 computer program based on an electrode module 54 having the dimensions and configurations set forth herein.

FIG. 5a depicts a trapping electric field 24 resulting from a voltage on electrode 58 of about +100 volts, a voltage on electrode 60 of −100 volts, and a voltage on field termination unit 56 of about 0 volts. The voltage on insulating support posts 62 was also selected to be about 0 volts. As can be seen in FIG. 5a, the potential lines 61 of trapping electric field 24 are highly uniform in the region between electrodes 58 and 60, thereby indicating that the electrode module 54 is very good at simulating an electric field that would be produced between two infinitely parallel plates.

FIG. 5b depicts the trapping electric field 24 on the same electrode module 54, except that the upper insulating support posts 62 (i.e., those supporting electrodes 58) have acquired an electric charge of about 10 kilovolts (kV). As can be seen in the upper portion of FIG. 5b, the potential lines 61 of trapping electric field 24 are still highly parallel in the region between electrodes 58 and 60, thereby indicating that the electrode module 54 is highly resistant to adverse effects resulting from unwanted charge buildup on the insulating support posts 62. That is, a charge buildup on insulating support posts 62 will not have a significant effect on the operation of the spectrometer 10.

Referring back now to FIG. 2, the spectrometer 10 may comprise a plurality of electrode modules 54 mounted in side-by-side or "stacked" relationship in order to create a cell 18 having a desired number of separate, opposed pairs of electrodes 16. Each electrode module 54 may be electrically insulated from an adjacent module by one or more electrically insulating spacer rings 80. Alternatively, other mounting arrangements may be utilized, as would become apparent to persons having ordinary skill in the art after having become familiar with the teachings provided herein. Insulating spacer rings 80 may be fabricated from any of a wide range of materials suitable for the particular application. By way of example, in one embodiment, the insulating spacer rings 80 are fabricated from alumina. Alternatively, insulating spacer rings 80 could be fabricated from a machinable glass ceramic material, such as MACOR®. In one embodiment, a plurality of elongated rods (not shown) sized to be received by spacer rings 80 and field termination unit 56 may be used to hold the various electrode modules 54 in the arrangements depicted herein. The elongated rods may be made from an insulating material, such as alumina or MACOR®.

Generally speaking, it is desired, but not required, to position the various electrode modules 54 as close to one another as possible so as to minimize the likelihood that stray electric fields will penetrate the space between adjacent electrode modules 54. By way of example, in one embodiment, the electrode modules 54 are positioned so that they are separated by a distance of about 3.8 mm. The spacing between any two adjacent electrodes (e.g., between electrodes 58) is likewise about 3.8 mm.

The various electrodes 58 and 60 of electrode modules 54 are electrically connected to the voltage source 22, e.g., via screws 63, as best seen in FIG. 1. Voltage source 22 is capable of providing various voltage potentials on the electrodes 58 and 60 so as to produce a wide range of static and dynamic electric fields in the manner described herein. For example, the voltage source 22 may be used to provide a trapping voltage function on some or all of the various opposed electrode pairs 16 in order to produce the trapping electric field 24 illustrated in FIGS. 6a and 6b. Voltage source 22 may also be used to apply an excitation voltage function (e.g., typically in the form of an alternating current of fixed or variable frequency) to some or all of the opposed electrode pairs 16 to produce an alternating electric field (not shown) suitable for exciting ions 20 contained within the cell 18.

Referring now primarily to FIGS. 6a and 6b, the trapping electric field 24 (FIG. 6a) utilized in one embodiment of the invention may comprise a field potential 26 (FIG. 6b) that, when taken in cross-section along the z-axis of the vacuum chamber 12, includes at least one convex section 28 having a convex curvature and at least one concave section 30 having a concave curvature. The trapping electric field 24 and corresponding field potential 26 depicted in FIGS. 6a and 6b were generated by the SIMION® computer program described above for a cell configuration comprising twenty five (25) electrode pairs 16, as illustrated in FIG. 6a. Alternatively, cell 18 could comprise a different number of electrode pairs 16. For example, another embodiment may comprise thirteen (13) electrode pairs 16 (FIG. 11), as will be described in greater detail below.

The trapping electric field 24 illustrated in FIG. 6a comprises a generally laterally symmetrical structure having first and second side portions 82 and 84 connected together by a middle portion 86. The first and second side portions 82 and 84 are located in the regions defined between twelve (12) opposed electrode pairs 16, whereas the middle portion 86 is located in the region defined between a single opposed electrode pair 16. The configuration of field potential 26 of the trapping electric field 24 is depicted in FIG. 6b and substantially follows the $n^{th}$ root power law. Roughly speaking, the side portions or wings 27 and 29 of field potential 26 are substantially linear and correspond to the first and second side portions 82 and 84 of trapping electric field 24 (FIG. 6a), whereas the convex section 28 and concave section 30 of field potential 26 are non-linear and correspond to the middle portion 86 of trapping electric field 24. The field potentials 26 of the respective sections are substantially continuous, i.e., joined together in a smooth manner. More specifically, the wings 27 and 29 of field potential 26 are joined together by first and second "convex" sections 28 and 28', which are separated by "concave" section 30 and respectively connected thereto by sections 32 and 34. Described in terms of mathematical functions, the convex sections 28 and 28' are "concave down," whereas the concave section 30 is "concave up."

As described above, the alternating convex sections 28, 28' and concave section 30 act to compensate for the magnetron effects, thereby preventing ions 20 from accumulating a change in cyclotron frequency. That is, the net magnetron effect will be zero, or nearly so, meaning that the change in cyclotron frequency will also be zero, or nearly so. For example, in the embodiment shown and described herein, the compensation occurs as follows: the magnetron effects on an ion 20 initially induce an increase in cyclotron frequency as the ion 20 traverses the first convex section 28 (e.g., from wing 27), then the cyclotron frequency is decreased in the concave section 30. The cyclotron frequency of the ion 20 is then increased again as the ion 20 encounters the second convex section 28', resulting in a final cyclotron frequency that is substantially the same as the original cyclotron frequency of ion 20 before it entered the alternating convex sections 28, 28' and concave section 30. In other words, the combined convex sections 28 and 28' cancel out or compensate for the cyclotron frequency change that occurs in the concave section 30. Accordingly, ion 20 experiences a net magnetron effect that is zero (or substantially equal to zero) each time it fully crosses or traverses the convex section 28 and concave section 30 of the field potential 26 of trapping electric field 24.

Viewed another way, the convex section 28 and concave section 30 have opposite effects on the cyclotron frequency such that the coherence or phase of the ions 20 throughout the cell 18 are nearly the same. While there is some slight phase shift in the convex section 28 as the cyclotron frequency is increased and a slight phase shift in the concave section 30 as the cyclotron frequency is decreased, the phase of the ions 20 in the wings 27 and 29 is constant, or nearly so. Therefore, detecting the ions 20 only with the plates in the electrode modules 54 in the wings 27 and 29 provides the best peak resolution. If detection in the convex section 28 and concave section 30 is included, then there will be some broadening of the peak shape. If the electrostatic components of the convex section 28 and concave section 30 are well-matched (or nearly so), the overall magnetron effect will be reduced or eliminated (i.e., the magnetron effect will be compensated), with the effect that the observed cyclotron frequency will be the true cyclotron frequency of the ions 20 in a magnetic field of given strength. In addition, the phase coherence of the ions 20 will be the same, or nearly so.

As already mentioned, a wide range of trapping electric fields 24 may be utilized that will result in such compensated magnetron effects and should be regarded as within the scope of the present invention. One class of electric fields that will result in such compensated magnetron effects are those that follow the $n^{th}$ root power law (i.e., $10^{n\sqrt{}}$). For example, the trapping electric field 24 illustrated in FIGS. 6a and 6b follows a second root power law (i.e., $10^{1/2}$). In another embodiment, to be discussed below and illustrated in FIG. 11, the trapping electric field 124 follows a third root power law (i.e., $10^{1/3}$).

The compensation of the magnetron effects is illustrated in FIG. 7, which depicts a computer simulation of a spiral path 48 followed by an exemplary ion 20 (see FIG. 1) during the excitation period. The computer simulation depicted in FIG. 7 was produced by the SIMION® computer program referenced above for a trapping electric field 24 substantially following the second root power law and for an excitation frequency that was matched to the mass-to-charge ratio of an ion 20 having a mass of 10,000 atomic mass units (amu). The spiral path 48 depicted in FIG. 7 represents the increasing cyclotron radius of the ion 20 as its energy increases during the excitation process. The ion 20 also follows a generally reciprocating axial path (i.e., generally back and forth along the z-axis of vacuum chamber 12, between wings 27 and 29 of field potential 26) that is induced by the trapping electric field 24.

During this reciprocation, the resonating ion 20 repeatedly traverses the convex section 28 and concave section 30 of the field potential 26, as illustrated in FIG. 6b. Because the net induced magnetron effects are zero (or substantially equal to zero), the cyclotron frequency of the resonating ion 20 remains unchanged (or nearly so). This fact is illustrated in FIG. 7 by the substantially straight line 50. The line 50 connects the locus of points that correspond to the position of the exemplary resonating ion 20 at intervals of the time period for the cyclotron frequency of the ion 20. Because the points occur at the same angular position on the spiral path 48, that is, because line 50 is substantially straight (as opposed to curved), the resonating ion 20 (see FIG. 1) depicted in the computer simulation illustrated in FIG. 7 is resonating at the true cyclotron frequency for the ion 20.

Another consequence of the compensated trapping electric field 24 is that ions 20 having the same mass-to-charge ratio will be excited to the same radius throughout the cell 18, which leads to improved mass accuracy, resolution, sensitivity, and quantitativeness of ion abundances (i.e., number of ions 20 in cell 18). This effect is illustrated in FIG. 8, which depicts a computer simulation of radial excitation paths 88, 88' and 88" followed by three ions having identical mass-to-charge ratios. The time for excitation of the three ions was the same. The computer simulation depicted in FIG. 8 was produced by the SIMION® computer program referenced above for a trapping electric field 24 substantially following the second root power law and a mass-to-charge ratio of about 100.

In addition, the compensated trapping electric field 24 allows ions 20 of different types to be excited to the same radii, thereby allowing the observed signals (e.g., processed data 44) to more accurately reflect the number of ions 20 within the cell 18, along with improved mass accuracy, resolution, and sensitivity. This effect is illustrated in FIG. 9, which depicts a computer simulation of radial excitation distances 90, 90' for ions 20 having different mass-to-charge ratios. Again, the time for excitation of the ions was the same. The computer simulation illustrated in FIG. 9 was produced by the SIMION® computer program for a trapping electric field 24 substantially following the second root power law. The radial excitation distances 90 are those for ions 20 having mass-to-charge ratios of about 100, whereas the radial excitation distances 90' are those for ions 20 having mass-to-charge ratios of about 5000.

Figure 10A:
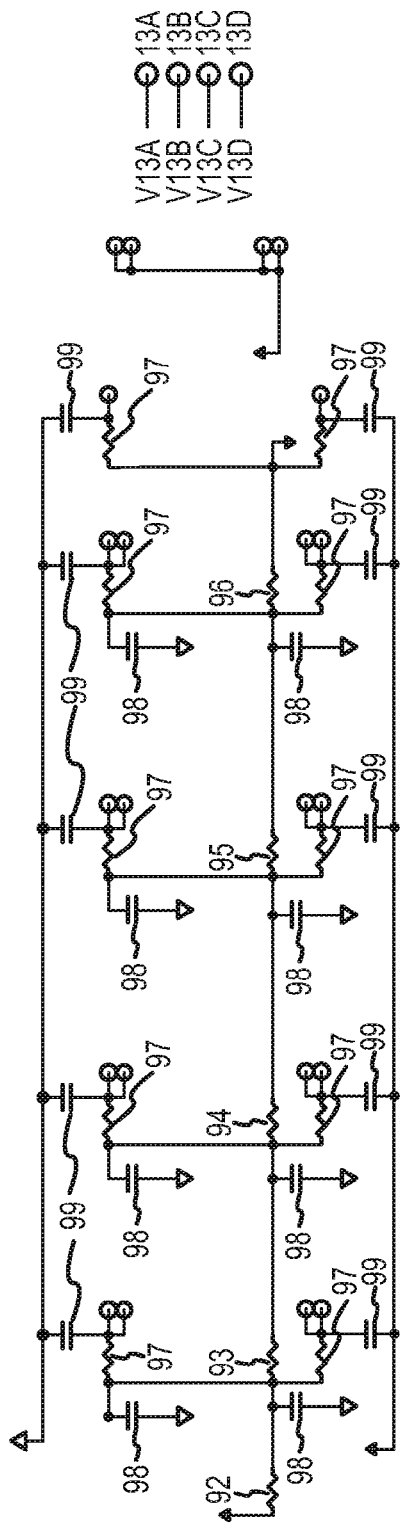
FIGS. 10a and 10b are electrical schematics of the one embodiment of a controller for electrically connecting the various electrode pairs to a voltage source and a detector.
Figure 10B:
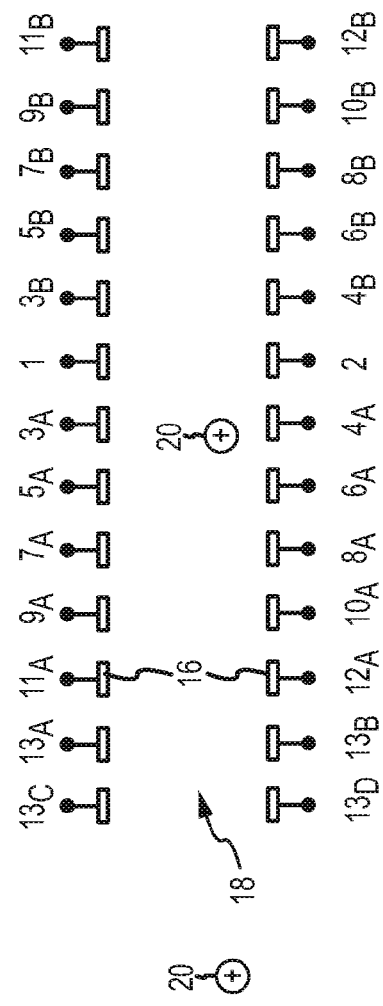

As mentioned above, the opposed electrode pairs 16 are utilized to produce or generate the electric fields used in the trapping and excitation modes. The electrode pairs 16 are also used to detect the decay of the resonating ions 20. In one embodiment, controller 23 is provided to allow the various voltage potentials to be applied to the opposed electrode pairs 16 as well as to allow for the detection of the signals produced by the decay of the resonating ions 20. FIGS. 10a and 10b are schematic representations of one embodiment of controller 23 (see FIG. 1) for providing this functionality.

Figure 11:
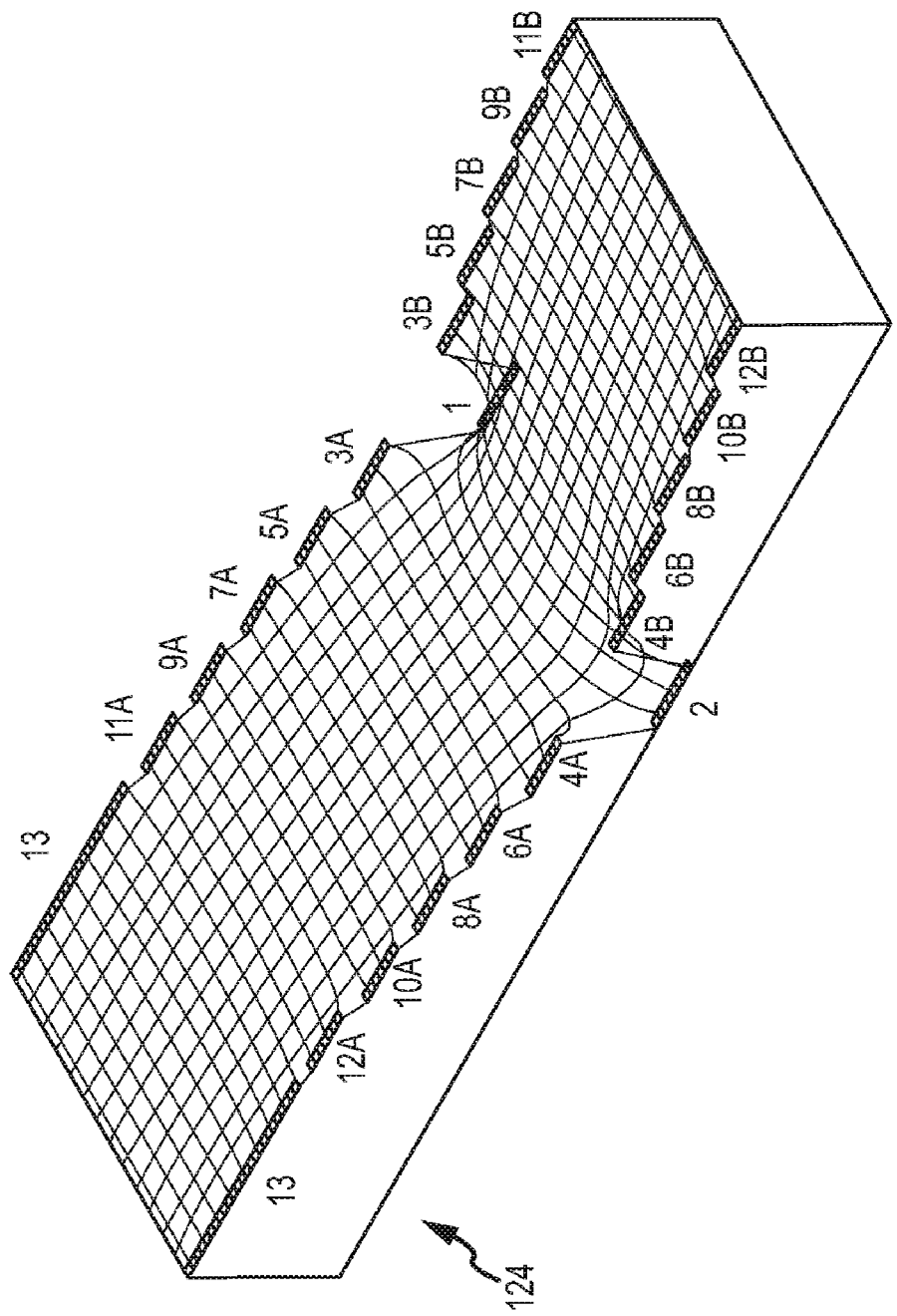
FIG. 11 is a computer-generated representation of a trapping electric field produced by a cell illustrated in FIG. 10b.

Referring specifically now to FIGS. 10a and 10b, the various pairs of opposed pairs of electrodes 16, which are schematically illustrated in FIG. 10b, may be electrically connected to the circuit illustrated in FIG. 10a. Each of the opposed pairs of electrodes 16 is numbered in accordance with the convention illustrated in FIGS. 10b and 11 and is connected to the corresponding circuit nodes illustrated in FIG. 10a. For example, the middle or "center" pair of electrodes, numbered 1 and 2 in FIGS. 10b and 11 is connected to various circuit nodes of the circuit illustrated in FIG. 10a. The electrodes 16 on the top portion of FIG. 10b are numbered with odd numbers 3, 5, 7, 9, 11, and 13, with the suffixes "A" and "B" denoting corresponding electrodes on the opposite sides of the top center electrode 1. Similarly, the electrodes 16 on the bottom portion of FIG. 10b are numbered with even numbers 4, 6, 8, 10, and 12, with the suffixes "A" and "B" denoting the corresponding electrodes on the opposite sides of the center bottom electrode 2. Electrodes 13A, B, C, and D may be utilized as "gate" electrodes. As will be explained in greater detail below, the potentials on gate electrodes 13 may be set so as to allow ions 20 from an ion source (not shown) to enter the cell 18. Of course, such gate electrodes 13 need not be used if a separate ion gate is provided, or if the ions 20 are to be generated or produced within the cell 18.

Referring now primarily to FIG. 10a, various voltages at various nodes are connected to voltage source 22 illustrated in FIG. 1. During the detection mode of operation, RF voltages are electrically connected to detector 36 (FIG. 1) to allow for the detection of signals induced on the electrodes by the resonating ions 20. In the embodiment illustrated in FIGS. 10a and 10b, eleven (11) opposed electrode pairs 16 (i.e., 1, 3A,B, 5A,B, 9A,B, 11A,B) are used to produce the trapping electric fields 24 (FIGS. 5a, 5b), 124 (FIG. 11) whereas nine (9) opposed electrode pairs 16 (i.e., electrodes numbered 2, 4A,B, 6A,B, 8A,B, 10A,B, 12A,B) are used to apply the excitation (e.g., RF) electric field. These same nine (9) pairs of electrodes are also used to detect the resonating ions 20 during the detection mode of operation. Alternatively, a greater or fewer number of electrode pairs 16 could be utilized in any given application, as would become apparent to persons having ordinary skill in the art after having become familiar with the teachings provided herein. Accordingly, the present invention should not be regarded as limited to embodiments wherein any particular number of electrodes are used in the preconditioning, trapping, excitation, and detection modes of operation.

The remaining two pairs of electrodes (i.e., electrodes numbered 13A-D) may be used to precondition and/or "gate" ions 20 into cell 18. In this regard, it should be noted that the remaining two pairs of electrodes 13A-D need not comprise two opposed pairs but could comprise other numbers depending on the particular application. For example, only one or two pairs of electrodes 13 may be required if they are used as a kinetic energy filter, while additional pairs may be required to perform dipolar "axialization" or some other function that may include the use of both DC and AC electric fields. It is important that, when the ions 20 are introduced into the cell 18, they have energies similar to potentials as "high" as possible on wings 27 and 29 of field potential 26 (FIG. 6b) (i.e., at positions near the outermost portions of wings 27, 29). If the ions 20 have excessive energies (i.e., greater than at the "high" portions of the wings 27, 29), they will traverse the cell 18 once and exit the far side. If ions 20 with low energies (i.e., similar to that in the concave section 30) are allowed to enter cell 18, they will remain in the concave section 30 and will have an uncompensated magnetron effect.

Still referring to FIG. 10a, resistors 92, 93, 94, 95, and 96 form a voltage divider between a DC voltage and ground (which may be designated by the symbol "V"). The values of the various resistors are selected to apply a voltage to the various electrode pairs 16 so that the resulting trapping electric field 24 has a field potential 26 that will compensate for magnetron effect. In the example illustrated in FIG. 10a, the values of the resistors 92, 93, 94, 95, and 96 (e.g., having values of 39, 12, 15, 23, and 100 kilohms (kΩ), respectively) will result in a trapping electric field 124 having a field potential that follows the third root power law, as illustrated in FIG. 11. Resistors 97 (e.g., having values of 10 megohms (MΩ)) couple the DC voltage to the various electrodes. Capacitors 98 (e.g., having values of 100 picofarads (pF)) decouple the DC bias and are basically radio-frequency shorts to ground. Capacitors 99 (e.g., having values of 1000 pF) couple the RF (AC) voltage to the electrodes. The combined RC time constant for capacitors 99 and resistors 97 has a cut-off low-pass frequency that is higher than the RF frequencies of interest.

Electrodes 11A,B and 12A,B may be connected to a DC voltage designated $V_{trap}$. The voltage $V_{trap}$ does not couple RF since it is desired to switch this signal on rapidly (i.e., not slowed by the RC network). The voltage $V_{trap}$ may be set somewhat higher than the voltage on electrodes 9A,B and 10A,B to filter ions 20 based on kinetic energy. For example, only ions above the DC voltage on electrodes 9A,B and 10A,B and below $V_{trap}$ will remain in the cell 18 to ensure that the ions 20 will oscillate through the middle portion 86 of trapping electric field 24 (see FIG. 6*a*). Gate electrodes 13A-D may be configured with voltages V13$_{a,b,c,d}$ to further filter based on ion kinetic energy or may be configured for other pretrapping or preconditioning of ions 20. Voltages V13$_{a,b,c,d}$ may be the same or different, depending on the particular function desired, as would become apparent to persons having ordinary skill in the art after having become familiar with the teachings provided herein.

Referring back now to FIG. 1, the spectrometer 10 may also be provided with a detector 36 that is electrically connected to at least some of the opposed electrode pairs 16. For example, in the embodiment illustrated in FIGS. 10*a*, 10*b*, and 11, electrodes 1, 2, 3A,B, 4A,B, 5A,B, 6A,B, 7A,B, 8A,B, 9A,B, and 10A,B may be connected to detector 36 via nodes V$_{rf+}$ and V$_{rf-}$. Detector 36 detects electrical signals 38 induced in the various opposed electrode pairs 16 by resonating ions 20 trapped within cell 18. Detector 36 produces output signals 42 that are related to the resonating ions 20.

A data processor 40 operatively associated with detector 36 may process output signals 42 produced by detector 36 to produce processed data 44. For example, in one embodiment, data processor 40 may be provided with a Fourier transform algorithm suitable for performing a Fourier transform on output signals 42 from the detector 36. Accordingly, the processed data 44 will comprise Fourier-transformed data. Processed data 44 from data processor 40 may thereafter be presented in a suitable display 46 or any other device or system that will allow a user to interpret the processed data 44.

However, because detector systems, data processing systems, display systems, and systems for the generation and amplification of the required excitation fields of the type that may be utilized in conjunction with the present invention are well known in the art and could be readily provided by persons having ordinary skill in the art after having become familiar with the teachings provided herein, the particular detector, data processing, and display systems that may be utilized in one embodiment will not be described in further detail herein.

The ion cyclotron resonance spectrometer 10 may be operated as follows to perform ion cyclotron resonance spectrometry. As illustrated in FIG. 1, vacuum chamber 12 may be positioned within a magnetic field so that the magnetic field vector 14 is generally parallel with the z-axis of vacuum chamber 12. The magnetic field vector 14 should be of sufficient strength so that, when combined with the trapping electric field 24, ions 20 are confined within the cell 18. In one embodiment, a magnetic field having a strength of about 7 tesla in the region generally within vacuum chamber 12 will provide acceptable results. Vacuum chamber 12 should also be evacuated and provided with ions 20 to be studied.

The ions 20 to be studied may be produced in accordance with any of a wide variety of processes. For example, in one embodiment, the ions 20 may be produced by a suitable ion source (not shown) positioned outside the cell 18 (e.g., to the left of cell 18 in FIG. 10*b*). Ions 20 may then be released or "gated" into cell 18 by placing the appropriate voltages on electrodes 13A-D in FIGS. 10*b* and 11. Alternatively, ions 20 may be produced within the vacuum chamber 12 itself, such as, for example, by using a laser (not shown) to ionize sample material previously provided within vacuum chamber 12. In any event, once ions 20 have been introduced within the cell 18 within vacuum chamber 12, voltage source 22 is operated to place a trapping voltage function on the various opposed electrode pairs 16. In the embodiment shown and described herein, this is accomplished by providing a DC voltage to the V$_{dc}$ node illustrated in FIG. 10*a*. The voltage divider network of resistors 92, 93, 94, 95, and 96 will cause various voltages to be applied to electrodes 1, 2, 3A,B, 4A,B, 5A,B, 6A,B, 7A,B, 8A,B, 9A,B, and 10A,B to be such that the trapping electric field 124 in accordance with the third root power law (FIG. 11) will be created in the cell 18.

The voltage source 22 then may be operated in an excitation mode in order to excite the ions 20 contained within the cell 18. In operating in the excitation mode, voltage source 22 places an alternating current (e.g., an RF) voltage between nodes V$_{rf+}$ and V$_{rf-}$ in FIG. 10*a*, the result of which will be the application of the excitation voltage function to the opposed pairs of electrodes 16. The excitation voltage function is provided in addition to the trapping voltage function so that ions 20 can be excited but still remain trapped within the cell 18. Generally speaking, the excitation voltage function will cause an alternating electric field (e.g., an RF field) to be established in the region between the opposed pairs of electrodes 16 that will be effective in causing ions 20 within the cell 18 to become excited (i.e., gain energy).

The excitation voltage function may comprise any of a wide range of functions suitable for exciting the ions 20 of interest. For example, in one embodiment, the excitation voltage function may be selected so as to cause the alternating electric field to vary at a fixed frequency, such as, for example, the cyclotron frequency of the ions of interest. Alternatively, the excitation voltage function may cause the electric field to vary at some combination of fixed frequencies. In still another embodiment, the excitation voltage function may cause the alternating electric field to vary across a predetermined frequency range, also known as a "chirp" function.

When the ions 20 are exposed to the excitation electric field, they resonate, continually gaining energy, which results in an increase in the cyclotron radius of the ions 20, as depicted by the spiral path 48 illustrated in FIG. 7. As the ions 20 resonate within the cell 18, they also follow reciprocating axial paths (i.e., generally back and forth along the z-axis) within vacuum chamber 12, as best seen in FIG. 8. As a result, the resonating ions 20 repeatedly traverse the convex section 28 and concave section 30 of the field potential 26 (FIG. 6*b*). Because the trapping electric field 24 results in a no-net magnetron effect as resonating ions 20 repeatedly traverse the convex section 28 and concave section 30, the cyclotron frequency of the resonating ions 20 remains unchanged, as evidenced by the straightness of line 50 illustrated in FIG. 7. In addition, ions 20 having the same mass-to-charge ratio will be excited to the same radial distance regardless of their z-axis positions in the cell 18, as best seen in FIG. 8. Ions 20 having different mass-to-charge ratios also will be excited to the same radii, as depicted in FIG. 9.

After a suitable period of excitation, ions 20 trapped within the cell 18 may be detected by detector 36. In one embodiment, detector 36 detects electrical signals induced on the various opposed pairs of electrodes 16 by the movement of the resonating ions 20 via nodes V$_{rf+}$ and V$_{rf-}$ in FIG. 10*a*. The data processor 40 may be used to process output signals 42 from detector 36 to produce processed data 44. By way of example, in an embodiment wherein the data processor 40 is provided with a Fourier transform algorithm, processed data 44 may comprise Fourier-transformed data. The Fourier-transformed data may then be presented on display 46.

Various embodiments of ion cyclotron spectrometers according to the teachings provided herein may be used to advantage to perform other types of ion detection, excitation, and manipulation processes. For example, while the foregoing description of the methods and apparatus of the present invention involve the placement of identical DC potentials on the various upper and lower electrodes 58 and 60, this need not be the case. For example, in another embodiment, a DC offset may be placed between the upper and lower electrodes 58 and 60 of each electrode module 54. Placing a DC offset on the electrodes 58 and 60 could cause the ions 20 to gradually move laterally to the sides of the cell 18, i.e., toward either of the fins 68 of the field termination unit 56. The shift direction would depend on the direction of the magnetic field vector 14 and the polarity of the DC offset on the electrodes 58 and 60. If the fins 68 are electrically isolated from the outer ring of field termination unit 56, then the fins 68 could be used to detect the lateral displacement of the ions 20.

More specifically, in one such embodiment, each fin 68 would be resistively connected to the outer ring of field termination unit 56 so that its DC potential would remain the same as that of the outer ring of field termination unit 56. Some or all of the fins 68 on the left side of the cell 18 would be coupled together (e.g., via a capacitor connected between adjacent fins 68). Similarly, some or all of the fins 68 on the right side of the cell 18 could be coupled together (e.g., via a capacitor connected between adjacent fins 68). The left and right groups of fins 68 could then be monitored for the AC signal created when ions 20 of the shifting (i.e., laterally moving) ion "cloud" induce a signal on either the left or right group of fins 68.

The circuit illustrated in FIG. 10a could be easily modified to allow an adjustable DC offset to be impressed between the upper and lower electrodes 58 and 60. Of course, the DC offset would be applied in addition to the common DC potential and any AC excitation potential. Any inadvertent or undesired magnetron motion could be balanced out by adjusting the DC offset to prevent the ion cloud from gradually shifting left or right within the cell 18. Balance could be confirmed when no signal was observed on either group of fins 68. That is, the fins 68 could be used to monitor cell performance.

The embodiment described above can also be used in conjunction with the method described below to provide an alternative way to selectively detect ions 20 within the cell 18. For example, and as was described above, detection of ions 20 within cell 18 may be performed via detection of the cyclotron motion. An alternative method would involve the use of a single excitation frequency to "spin-up" ions 20 of a desired or selected mass-to-charge ratio. The radii of the selected ions 20 would increase to the point where they were well beyond the outside of the remaining ion cloud. At this point, the excitation phase could be terminated. A slight differential potential (i.e., DC offset) could be placed across opposed electrodes 58 and 60 to cause all of the ions 20 to gradually shift toward the left or right group of fins 68. As the excited ions 20 impact the fins 68, their signal would be detected (e.g., by detector 36). If the DC offset is maintained, the remaining ions 20 in the smaller ion cloud would then impact the fins 68, creating a second detection peak. The intensity of the signal resulting from the impact of the excited ions could then be compared with the normal FTMS detection for the selected mass-to-charge ratio.

The method could be extended to detect multiple ion types in the same ion cloud. This would require that the excited ions 20 be detected and then the DC offset be immediately reversed for a period of time to re-center the ion cloud within the cell 18. Then, another excitation frequency would be imposed to selectively excite ions 20 of another mass-to-charge ratio. These excited ions 20 would then be detected in a similar manner. The process can be repeated so long as sufficient ions 20 remain in the cell 18.

Yet another method for multiple ion detection involves ion excitation via a fixed number of frequencies designed to only excite selected groups of ions 20 with desired mass-to-charge ratios. In this method, the amplitude and/or duration of each selected excitation frequency potential would be selected to excite each group of ions 20 to differing and non-overlapping cyclotron orbit radii. Thus, when the DC offset between the upper and lower electrodes 58 and 60 is used to shift the excited ions 20 laterally out of the cell 18 and into the fins 68, each excited mass-to-charge ratio ion group could create a separate and distinguishable peak.

Having herein set forth preferred embodiments of the present invention, it is anticipated that suitable modifications can be made thereto which will nonetheless remain within the scope of the invention. Therefore, the invention shall only be construed in accordance with the following claims.

The invention claimed is:

1. An ion cyclotron spectrometry apparatus, comprising:
a vacuum chamber that extends at least along a z-axis;
a plurality of opposed electrode pairs positioned within the vacuum chamber and extending along the z-axis, wherein the ion cyclotron spectrometry apparatus is configured for producing a magnetic field within the vacuum chamber and between the plurality of opposed electrode pairs so that a magnetic field vector between the plurality of opposed electrode pairs is generally parallel to the z-axis; and
a voltage source electrically connected to the plurality of opposed electrode pairs and configured to simultaneously apply at least a trapping voltage function to the plurality of opposed electrode pairs and an excitation voltage function to a subset of the plurality of opposed electrode pairs, the trapping voltage function configured to establish a trapping electric field between the plurality of opposed electrode pairs and comprising at least a first section configured to induce a first magnetron effect that increases a cyclotron frequency of an ion and at least a second section configured to induce a second magnetron effect that decreases the cyclotron frequency of the ion so that the ion traversing the at least first and second sections will experience no net change in cyclotron frequency.

2. The apparatus of claim 1, wherein the trapping electric field follows a curvature described by an $n^{th}$ root power of 10.

3. The apparatus of claim 1, wherein the excitation voltage function is configured to cause an alternating electric field to be established between at least some of the plurality of opposed electrode pairs, the alternating electric field configured to cause ions contained within the vacuum chamber to resonate.

4. The apparatus of claim 3, wherein the excitation voltage function is configured to cause the alternating electric field to vary at one of a fixed frequency and different amplitudes.

5. The apparatus of claim 1, further comprising a detector operatively connected to at least some of the plurality of opposed electrode pairs, the detector configured to detect resonating ions contained within the vacuum chamber.

6. The apparatus of claim 5, further comprising a data processing system operatively associated with the detector, the data processing system comprising a transform algorithm configured to perform a transform of data from the detector.

7. An ion cyclotron spectrometer, comprising:
means for producing a magnetic field within a vacuum chamber extending at least along a z-axis so that a magnetic field vector is generally parallel to the z-axis; and
means for producing a trapping electric field within the vacuum chamber and comprising a first substantially linear portion extending downward from a first end of the trapping electric field, a second substantially linear portion extending downward from a second end of the trapping electric field, at least a first section between the first substantially linear portion and the second substantially linear portion and configured to induces a first magnetron effect that increases a cyclotron frequency of an ion and at least a second section between the first substantially linear portion and the second substantially linear portion and configured to induces a second magnetron effect that decreases the cyclotron frequency of the ion so that the ion traversing the at least first and second sections will experience no net change in cyclotron frequency.

8. The ion cyclotron spectrometer of claim 7, wherein the trapping electric field follows a curvature described by an $n^{th}$ root power of 10.

9. A method for performing ion cyclotron spectrometry, comprising:
providing ions within a vacuum chamber;
producing a magnetic field within the vacuum chamber so that a magnetic field vector is generally parallel to a z-axis of the vacuum chamber;
producing a trapping electric field within the vacuum chamber and comprising a first portion extending linearly downward from a first end of the trapping electric field to a first section of a second portion configured to induce a magnetron effect that increases a cyclotron frequency of an ion, the trapping electric field further comprising a third portion extending linearly downward from a second end of the trapping electric field to a third section of the second portion configured to induce an additional magnetron effect that increases the cyclotron frequency of the ion, the second portion including second section between the first section and the third section and configured to induce another magnetron effect that decreases the cyclotron frequency of the ion, so that the ion traversing the first, second, and third sections will experience no net change in cyclotron frequency;
exciting ions trapped by the magnetic and trapping electric fields; and
detecting excited ions.

10. The method of claim 9, wherein exciting ions further comprises establishing an alternating electric field within the vacuum chamber, the alternating electric field causing ions contained within the vacuum chamber to resonate.

11. The method of claim 10, further comprising one of varying the alternating electric field at a fixed frequency and varying the alternating electric field across a predetermined frequency range.

12. The method of claim 9, wherein detecting excited ions further comprises detecting output signals from a detector provided within the vacuum chamber.

13. The method of claim 9, wherein producing a magnetic field comprises producing a magnetic field having a strength of at least about 7 tesla within the vacuum chamber.

14. The method of claim 9, wherein providing ions within a vacuum chamber comprises one of introducing ions into the vacuum chamber from a location outside the vacuum chamber and ionizing atoms contained within the vacuum chamber.

15. The method of claim 9, wherein producing a trapping electric field comprises producing a trapping electric field having a field potential that follows a curvature described by an $n^{th}$ root power law.

16. An ion cyclotron spectrometry apparatus, comprising:
a vacuum chamber that extends at least along a z-axis;
a plurality of opposed electrode pairs positioned within the vacuum chamber and extending along the z-axis, wherein the ion cyclotron spectrometry apparatus is configured to produce a magnetic field within the vacuum chamber and between the plurality of opposed electrode pairs so that a magnetic field vector between the plurality of opposed electrode pairs is generally parallel to the z-axis; and
a voltage source electrically connected to the plurality of opposed electrode pairs and configured to apply a trapping voltage function to the plurality of opposed electrode pairs to produce a trapping electric field and simultaneously apply an excitation voltage function to a fewer number of opposed electrode pairs of the plurality of opposed electrode pairs to which the trapping voltage function is applied, the trapping voltage function configured to cause a substantially uniform electric field to be established between the plurality of opposed electrode pairs, the substantially uniform electric field comprising a plurality of potential lines that are substantially parallel in a region between the plurality of opposed electrode pairs.

17. The apparatus of claim 16, wherein the trapping voltage function comprises a DC voltage function and the excitation voltage function comprises an AC voltage function.

18. The apparatus of claim 17, wherein the DC voltage function causes a trapping electric field to be established between the plurality of opposed electrode pairs that comprises at least a first section that results in an increased cyclotron frequency of an ion and at least a second section that results in a decreased cyclotron frequency of the ion so that the ion traversing the at least first and second sections will experience a cyclotron frequency change that is substantially equal to zero.

19. The apparatus of claim 17, wherein the DC voltage function is configured to provide a DC offset between at least some of the plurality of opposed electrode pairs, the DC offset configured to cause lateral movement of ions.

20. The apparatus of claim 16, further comprising a plurality of inwardly projecting fins located at positions substantially between each of the plurality of opposed electrode pairs.

21. The apparatus of claim 20, wherein each of the plurality of inwardly projecting fins is operatively associated with the voltage source, the voltage source configured to apply a voltage function to each of the plurality of inwardly projecting fins.

22. The apparatus of claim 21, further comprising a detector, the detector being operatively connected to each of the plurality of inwardly projecting fins.

23. An ion cyclotron spectrometer configured to:
produce a magnetic field within a vacuum chamber extending at least along a z-axis so that a magnetic field vector is generally parallel to the z-axis; and
produce a trapping electric field within the vacuum chamber and including a first portion extending substantially linearly downward from a first end of the trapping electric field to a convex portion of an inner region and a second portion extending substantially linearly downward from a second opposite end of the trapping electric field to another convex portion of the inner region, the inner region configured to induce compensated magnetron effects so that a net change in cyclotron frequency of an ion is substantially equal to zero.

24. An ion cyclotron spectrometer, comprising:
means for producing a magnetic field within a vacuum chamber extending at least along a z-axis so that a magnetic field vector is generally parallel to the z-axis; and means for producing a trapping electric field within the vacuum chamber and comprising a non-linear section having at least one cyclotron frequency-increasing portion and a cyclotron frequency-decreasing portion for each at least one cyclotron frequency-increasing portion and a first linear portion extending upward from an end of the non-linear section to a first end of the trapping electric field and a second linear portion extending upward from another end of the non-linear section to a second end of the trapping electric field, the trapping electric field configured to induce compensated magnetron effects so that confined ions experience a net phase shift that is substantially equal to zero.

* * * * *

UNITED STATES PATENT AND TRADEMARK OFFICE
CERTIFICATE OF CORRECTION

PATENT NO. : 7,777,182 B2  
APPLICATION NO. : 11/833079  
DATED : August 17, 2010  
INVENTOR(S) : David A. Dahl, Jill R. Scott and Timothy R. McJunkin Page 1 of 1

It is certified that error appears in the above-identified patent and that said Letters Patent is hereby corrected as shown below:

In the specification:

COLUMN 18, LINE 42, change "symbol "V")." to --symbol " $\nabla$ ").--

In the claims:
CLAIM 7, COLUMN 23, LINE 4, change "induces" to --induce--
CLAIM 7, COLUMN 23, LINE 8, change "induces" to --induce--
CLAIM 9, COLUMN 23, LINE 32, change "including" to --including a--

Signed and Sealed this
Twenty-seventh Day of August, 2013

Teresa Stanek Rea
*Acting Director of the United States Patent and Trademark Office*